United States Patent
Kucharski et al.

(10) Patent No.: US 7,515,775 B1
(45) Date of Patent: Apr. 7, 2009

(54) DISTRIBUTED AMPLIFIER OPTICAL MODULATOR

(75) Inventors: Daniel Kucharski, Carlsbad, CA (US); Behnam Analui, Del Mar, CA (US); Lawrence C. Gunn, III, Encinitas, CA (US); Roger Koumans, Irvine, CA (US); Thierry Pinguet, Cardiff by the Sea, CA (US); Thiruvikraman Sadagopan, Carlsbad, CA (US)

(73) Assignee: Luxtera, Inc., Carlsbad, CA (US)

( * ) Notice: Subject to any disclaimer, the term of this patent is extended or adjusted under 35 U.S.C. 154(b) by 0 days.

(21) Appl. No.: 11/540,172

(22) Filed: Sep. 29, 2006

Related U.S. Application Data

(63) Continuation-in-part of application No. 11/363,512, filed on Feb. 27, 2006, which is a continuation of application No. 10/917,927, filed on Aug. 13, 2004, now Pat. No. 7,039,258.

(60) Provisional application No. 60/495,402, filed on Aug. 15, 2003, provisional application No. 60/495,403, filed on Aug. 15, 2003, provisional application No. 60/495,404, filed on Aug. 15, 2003.

(51) Int. Cl.
*G02F 1/01* (2006.01)
(52) U.S. Cl. .................................. 385/1; 385/2; 385/3
(58) Field of Classification Search ........................ None
See application file for complete search history.

(56) References Cited

U.S. PATENT DOCUMENTS

| | | | |
|---|---|---|---|
| 3,827,000 A | 7/1974 | Matsushita et al. | |
| 4,666,295 A * | 5/1987 | Duvall et al. | 356/5.09 |
| 5,422,966 A | 6/1995 | Gopalakrishnan et al. | |
| 5,532,867 A | 7/1996 | Hayes et al. | |
| 5,546,218 A * | 8/1996 | Komatsubara et al. | 359/237 |
| 5,550,513 A | 8/1996 | Wong | |
| 5,589,786 A * | 12/1996 | Bella et al. | 327/108 |
| 5,870,512 A | 2/1999 | Koch et al. | |
| 6,233,070 B1 | 5/2001 | Lu et al. | |
| 6,522,793 B1 | 2/2003 | Szilagyi et al. | |
| 6,587,256 B2 | 7/2003 | Leight et al. | |
| 6,623,188 B1 | 9/2003 | Dimmick et al. | |
| 6,763,197 B1 | 7/2004 | Hirano et al. | |
| 6,882,758 B2 | 4/2005 | Betty | |
| 7,039,258 B2 | 5/2006 | Gunn, III et al. | |
| 7,321,242 B2 * | 1/2008 | Mandegaran et al. | 326/89 |

(Continued)

OTHER PUBLICATIONS

Authors: Ansheng Liu, Richard Jones, Ling Liao, Dean Samara-Rubio, Doron Rubin, Oded Cohen, Remus Nicolaescu, Mario Paniccia Title: A High-Speed Silicon Optical Modulator Based on a Metal-Oxide-Semiconductor Capacitor Nature Publishing Group, vol. 427 Feb. 12, 2004.

*Primary Examiner*—Sung H Pak
*Assistant Examiner*—Mike Stahl
(74) *Attorney, Agent, or Firm*—Knobbe, Martens, Olson & Bear, LLP

(57) ABSTRACT

Various embodiments described herein comprises an optoelectronic device comprising a waveguide structure including a plurality of optical modulator elements each having an optical property that is adjustable upon application of an electrical signal so as to modulate light guided in the waveguide structure. The optoelectronic device also comprises a plurality of amplifiers in distributed fashion. Each amplifier is electrically coupled to one of the optical modulators to apply electrical signals to the optical modulator.

10 Claims, 19 Drawing Sheets

U.S. PATENT DOCUMENTS

| | | |
|---|---|---|
| 2002/0109897 A1 | 8/2002 | Mirshekar-Syahkal et al. |
| 2002/0154842 A1 | 10/2002 | Betts |
| 2002/0159121 A1 | 10/2002 | Spickermann |
| 2002/0195622 A1* | 12/2002 | Ishimura ..................... 257/200 |
| 2003/0081878 A1* | 5/2003 | Joyner et al. .................. 385/14 |
| 2003/0101575 A1 | 6/2003 | Green et al. |
| 2003/0142384 A1 | 7/2003 | Kurebayashi |
| 2003/0227666 A1 | 12/2003 | Bridges |
| 2004/0109658 A1* | 6/2004 | Wipiejewski et al. ....... 385/129 |
| 2004/0162470 A1* | 8/2004 | Tu ............................. 600/316 |
| 2004/0165893 A1 | 8/2004 | Winzer |
| 2004/0246557 A1 | 12/2004 | Lefevre et al. |
| 2004/0264535 A1* | 12/2004 | Svenson ...................... 372/50 |
| 2007/0230854 A1* | 10/2007 | Felix Keil ...................... 385/1 |
| 2007/0237444 A1* | 10/2007 | Keil ............................. 385/3 |
| 2007/0280576 A1 | 12/2007 | Kucharski et al. |
| 2007/0292073 A1* | 12/2007 | Li ............................... 385/14 |

* cited by examiner

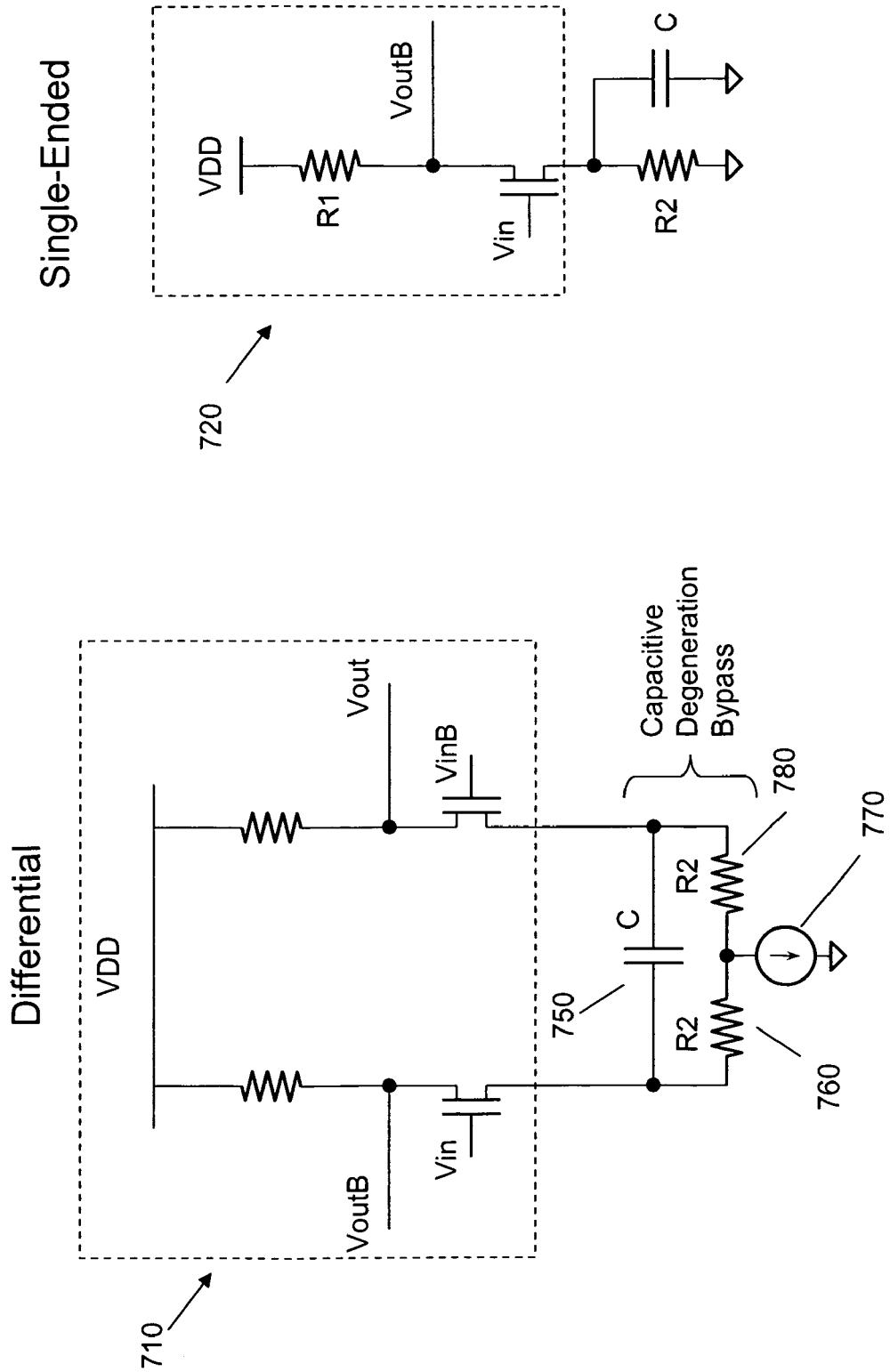

DISTRIBUTED AMPLIFIER OPTICAL MODULATOR

PRIORITY APPLICATIONS

This application is a continuation-in-part of U.S. application Ser. No. 11/363,512, filed on Feb. 27, 2006 and entitled "DISTRIBUTED AMPLIFIER OPTICAL MODULATORS", which is a continuation of U.S. application Ser. No. 10/917,927, filed on Aug. 13, 2004, which is incorporated herein by reference in its entirety, and which in turn claims priority under 35 U.S.C. § 119(e) to U.S. Provisional Applications Ser. No. 60/495,402, No. 60/495,403, and No. 60/495,404 filed on Aug. 15, 2003.

BACKGROUND

1. Field of the Invention

The invention relates generally to the field of optical modulators and more particularly to a distributed amplifier optical modulator for use in optoelectronic integrated circuits.

2. Description of the Related Art

Optical fibers have been widely used for the propagation of optical signals, especially to provide high speed communication links. Optical links using fiber optics have many advantages compared to electrical links. These advantages include large bandwidth, high noise immunity, reduced power dissipation, and reduced crosstalk. Fiber optic communication links can operate with carrier frequencies in the THz range. In communication systems where optical fibers are used to transport optical communication signals, various optoelectronic devices are used to control, modify, and process the optical signals.

An integrated optical modulator is one such component of an optical communication system. Certain optical modulators use an electrical signal to modulate some property of an optical wave, such as the phase or the amplitude. A modulated optical wave can be sent on a fiber optic link or processed by other optical or optoelectronic devices.

Integrated optoelectronic devices made of silicon are highly desirable since they can be fabricated in the same foundries used to make VLSI integrated circuits. Optoelectronic devices integrated with their associated electronic circuits can eliminate the need for more expensive hybrid optoelectronic circuits. Optoelectronic devices built using a standard CMOS process have many advantages, including high yields, low fabrication costs, and continuous process improvements.

Distributed amplifier optical modulators have been suggested that use a plurality, e.g., k modulators connected in series disposed on one of a variety of semiconductor substrates or wafers. An electrical signal propagating in a microwave transmission line in such distributed amplifier modulators is tapped off of the transmission line at regular intervals and is amplified by k distributed amplifiers which output the electrical signal to a respective one of the k modulators. These distributed amplifier modulators can have much higher modulating speeds than a comparable single lumped element modulator, as the distributed arrangement allow the input capacitance of the distributed amplifier blocks to be absorbed into the characteristic impedance of the input transmission line. The distributed amplifier modulators driving a plurality of lumped modulator elements can also have lower power consumption than comparable traveling wave modulators having a terminated output transmission line because no power is dissipated in the termination resistance of the output transmission line. However, the speed, performance reliability, and the size of the distributed amplifier modulators can be improved.

SUMMARY

One embodiment of the invention comprises an optoelectronic device. The optoelectronic device comprises a waveguide structure including a plurality of optical modulator elements each having an optical property that is adjustable upon application of an electrical signal so as to modulate light guided in said waveguide structure, and a plurality of amplifiers, each amplifier electrically coupled to one of said optical modulators to apply electrical signals thereto. At least one of the plurality of amplifiers may comprise one or more first type transistors electrically connected between a first reference potential and an output node and one or more second type transistors electrically connected between said output node and a second reference potential, said first and second type transistors being complementary.

Another embodiment of the invention comprises an optoelectronic device. The optoelectronic device comprises a waveguide structure including a plurality of optical modulator elements each having an optical property that is adjustable upon application of an electrical signal so as to modulate light guided in the waveguide structure. The optoelectronic device also comprises a plurality of amplifiers wherein each amplifier is electrically coupled to one of the optical modulators to apply electrical signals to the optical modulator. At least one of the plurality of amplifiers comprises a single pair of complementary transistors.

Another embodiment of the invention comprises an optoelectronic device. The optoelectronic device comprises a waveguide structure including a plurality of optical modulator elements each having an optical property that is adjustable upon application of an electrical signal so as to modulate light guided in the waveguide structure. The optoelectronic device also comprises a plurality of amplifiers wherein each amplifier is electrically coupled to one of the optical modulators to apply electrical signals to the optical modulator. At least one of the plurality of amplifiers comprises bandwidth extension circuitry.

Another embodiment of the invention comprises an optoelectronic device. The optoelectronic device comprises a waveguide structure including a plurality of optical modulator elements each having an optical property that is adjustable upon application of an electrical signal so as to modulate light guided in the waveguide structure. The optoelectronic device further comprises a capacitive degeneration bypass, a negative resistance element, or a transformer to increase bandwidth. The optoelectronic device also comprises plurality of amplifiers wherein each amplifier is electrically coupled to one of the optical modulators to apply electrical signals to the optical modulator and at least one of the plurality of amplifiers comprises a push-pull driver circuit.

Another embodiment of the invention comprises an optoelectronic device. The optoelectronic device comprises a waveguide structure including a plurality of optical modulator elements each having an optical property that is adjustable upon application of an electrical signal so as to modulate light guided in the waveguide structure. The optoelectronic device also comprises a plurality of amplifiers wherein each amplifier is electrically coupled to one of the optical modulators to apply electrical signals to the optical modulator. At least one of the plurality of amplifiers comprises a push-pull driver circuit. The optoelectronic device further comprises at least one additional amplifier stage electrostatically or magnetically coupled to one of said amplifiers to increase bandwidth.

Another embodiment of the invention comprises an optoelectronic device. The optoelectronic device comprises a waveguide structure including a plurality of optical modulator elements each having an optical property that is adjustable upon application of an electrical signal so as to modulate light guided in the waveguide structure. The optoelectronic device also comprises a plurality of amplifiers wherein each amplifier is electrically coupled to one of the optical modulators to apply electrical signals to the optical modulator. The optoelectronic device also comprises a plurality of waveform shaping circuits each having a signal input port and a signal output port wherein each of the signal output ports is electrically connected to a respective one of the plurality of amplifiers and each of the plurality of waveform shaping circuits include a control input for establishing rise time, overshoot, fall time, undershoot, or duty cycle of an electrical signal applied to the optical modulator element.

Another embodiment of the invention comprises an optoelectronic device. The optoelectronic device comprises a waveguide structure including a plurality of optical modulator elements each having an optical property that is adjustable upon application of an electrical signal so as to modulate light guided in the waveguide structure. The optoelectronic device also comprises a plurality of amplifiers, each amplifier electrically coupled to one of the optical modulators to apply electrical signals to the optical modulator. The optoelectronic device also comprises a plurality of lumped element LC circuits connected in series such that an electrical signal can pass through the lumped element LC circuits, and each of the lumped element LC circuits is electrically connected to respective inputs of the plurality of amplifiers.

Another embodiment of the invention comprises an optoelectronic device. The optoelectronic device comprises a waveguide structure including a plurality of optical modulator elements each having an optical property that is adjustable upon application of an electrical signal so as to modulate light guided in the waveguide structure. The optoelectronic device also comprises a plurality of amplifiers wherein each amplifier is electrically coupled to one of the optical modulators to apply electrical signals to the optical modulator, and wherein the waveguide structure comprises a path that undulates laterally or is folded such that the distance light propagates within the waveguide structure is substantially larger than the length of the waveguide structure.

Another embodiment of the invention comprises an optoelectronic device. The optoelectronic device comprises a waveguide structure including a plurality of optical modulator elements each having an optical property that is adjustable upon application of an electrical signal so as to modulate light guided in the waveguide structure. The optoelectronic device also comprises a plurality of amplifiers wherein each amplifier is electrically coupled to one of the optical modulators to apply electrical signals to the optical modulator. At least one of the plurality of amplifiers comprises a push-pull driver circuit.

BRIEF DESCRIPTION OF THE DRAWINGS

For a more complete understanding of the present invention and for further features and advantages, reference is now made to the following description taken in conjunction with the accompanying drawings.

FIGS. 7A and 7B illustrate capacitive degeneration bypass for a differential and a single ended amplifier.

DETAILED DESCRIPTION OF THE PREFERRED EMBODIMENT

Figure 1:
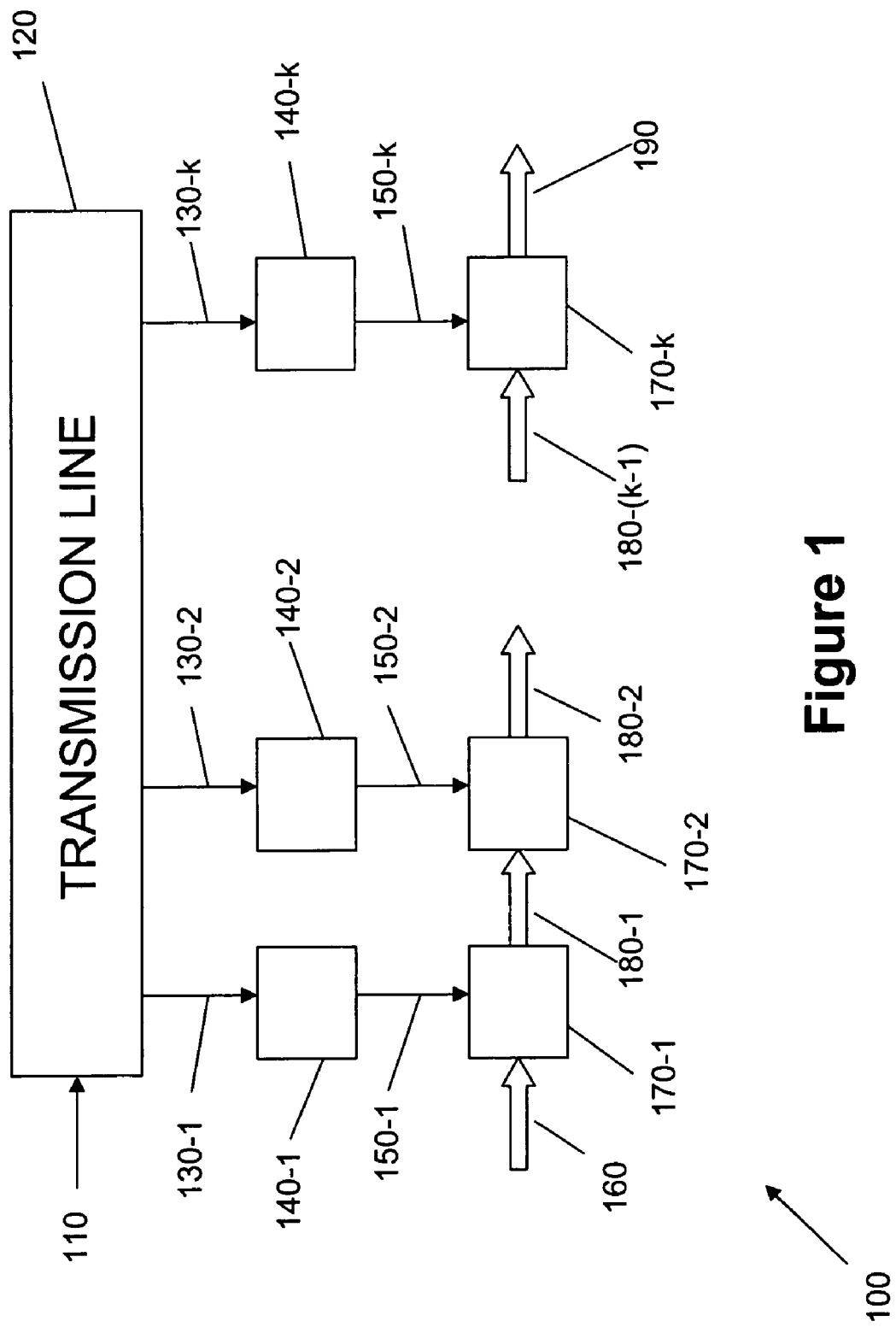
FIG. 1 is a block diagram of an integrated distributed amplifier optical modulator.

FIG. 1 is a block diagram of an integrated distributed amplifier (DA) optical modulator. DA modulator 100 includes a transmission line (TL) 120, k distributed amplifiers 140-1 to 140-k and series connected k modulating elements 170-1 to 170-k. TL 120 receives a modulating signal 110 on its input port and has k output signals 130-1 to 130-k. Each of the output signals 130-i is delayed relative to the previous output signal 130-(i−1). The amount of delay depends on the length of the transmission line between any two adjacent output ports. Each of the k output signals of the TL 120 is connected to the respective inputs of the amplifiers 140-1 to 140-k. Each of the output signals 150-1 to 150-k of amplifiers 140-1 to 140-k is connected to the modulating input terminal of a respective k optical modulating element 170-1 to 170-k.

Optical wave 160 is connected to the optical input of the first modulating element 170-1. The modulated optical output 190 is generated at the end of the series of modulating elements, at the output of modulating element 170-k. Optical wave 160 is first modulated by modulating element 170-1 driven by the electrical signal 150-1 from the TL 120. Output 180-1 of the modulating element 170-1 is connected to the input of the modulating element 170-2, where the optical wave is further modulated by electrical signal 150-2 from the TL 120. Each successive modulating element in the series can provide additional modulation. This process continues through the k stages of the modulator, until the fully modulated optical output 190 of the last modulating element 170-k is generated.

Figure 2:
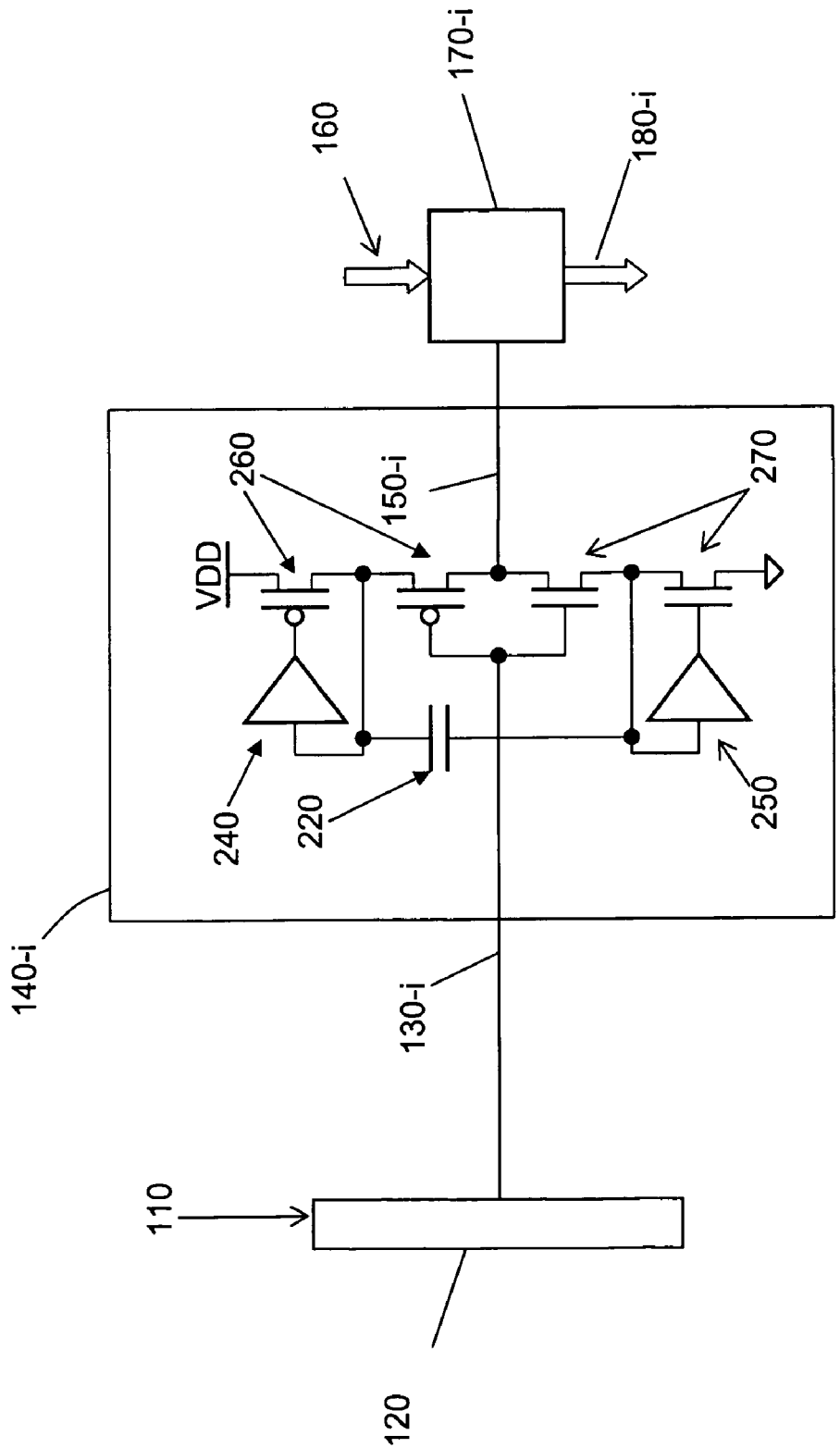
FIG. 2 is a block diagram of a single distributed amplifier stage connected to a respective modulating element.

FIG. 2 is a block diagram of one of the k distributed amplifiers connected to a respective one of the k modulating elements, in accordance with one embodiment of the present invention. The TL 120 receives the modulating signal 110 on its input port and outputs a signal 130-i to the amplifier 140-i. In accordance with certain preferred embodiments of the present invention, the amplifier 140-i is a push-pull driver circuit comprising of a stack of two p-type devices 260 and two n-type devices 270. Using a stack of two or more transistors is advantageous, because transistor stacking prevents high voltage breakdown. The voltage required to drive an optical modulating element from the ground potential to the VDD potential may be too high for transistors having low voltage breakdowns. Therefore, if any of these transistors are exposed to the high voltage needed for driving an optical modulating element, the reliability of the transistors is reduced over time, and they could become permanently damaged. Therefore, according to the preferred embodiments of the present invention, a stack of two or more transistors is used so that the voltage potential is split equally between the two devices. This reduces the probability that any one of the transistors would break down as a result of excessively high voltage.

Additionally, the use of complementary transistors in the amplifier 140-i is also advantageous because complementarily configurations result in lower power consumption. Furthermore, certain embodiments of the DA optical modulator can therefore achieve a high voltage swing across the terminals of the modulating elements. In order to achieve the highest possible voltage swing, the voltage swing should be substantially equal to the VDD potential. That can be achieved by using a complementary configuration. Thus, in accordance with various preferred embodiments of the present invention, an amplifier 140-i includes a stack of two p-type transistors and two n-type transistors.

However, even though a stack of two complementary transistors is shown in FIG. 2, the push-pull amplifier could include only a single pair of complementary transistors. Additionally, the push-pull amplifier could also include a pair of more than two complementary transistors. Furthermore, the n-type devices that are used could be either NFET or npn transistors and the p-type devices that are used could be either PFET or pnp transistors. Other types of transistors, other numbers of transistors, and other arrangements of transistors are also possible.

Referring back to FIG. 2, amplifier 240 may be configured for active breakdown protection to assure that there is a generally equal voltage drop across the terminals of both transistors in the upper stack, which may comprise of two n-type transistors, and that neither of the transistors in the upper stack are subject to very high voltage. Similarly, amplifier 250 may be configured for active breakdown protection to assure that there is a generally equal voltage drop across the terminals of both transistors of the lower stack, which may comprise of two p-type transistors, and that neither of the transistors in the lower stack are subject to very high voltage. The amplifiers 240 and 250 may, for example, monitor the midpoint voltage between the two transistors in the stack and adjust the gate voltage on the bottom transistor according to the value of the mid-point voltage. This adjusting of the gate voltage can assure that equal voltage is dropped across the terminals of each transistor in the stack. Thus, the amplifiers 240 and 250 can actively regulate the current signal that goes through the transistors and prevent premature failure of the transistors.

The output signal 150-i of the amplifier 140-i is connected to an input port of the modulating element 170-i. The output signal 150-i modulates the optical wave 160 to produce a modulated optical wave 180-i. The modulated optical wave 180-i may be input to a next successive modulating element for further modulation.

A capacitor 220 is connected between the amplifiers 240 and 250. The capacitor is connected such that it connects the source of a first NFET transistor and the drain of a second NFET transistor to the source of a first PFET transistor and the drain of a second PFET transistor. The addition of this capacitor is advantageous in that it can result in capacitive coupling between the transistors. This coupling stabilizes the voltage difference between the midpoint node of the NFET transistors and the midpoint node of the PFET transistors during transitions and helps enhance high frequency performance of the active breakdown protection circuits by fixing their relative voltage.

Figure 3:
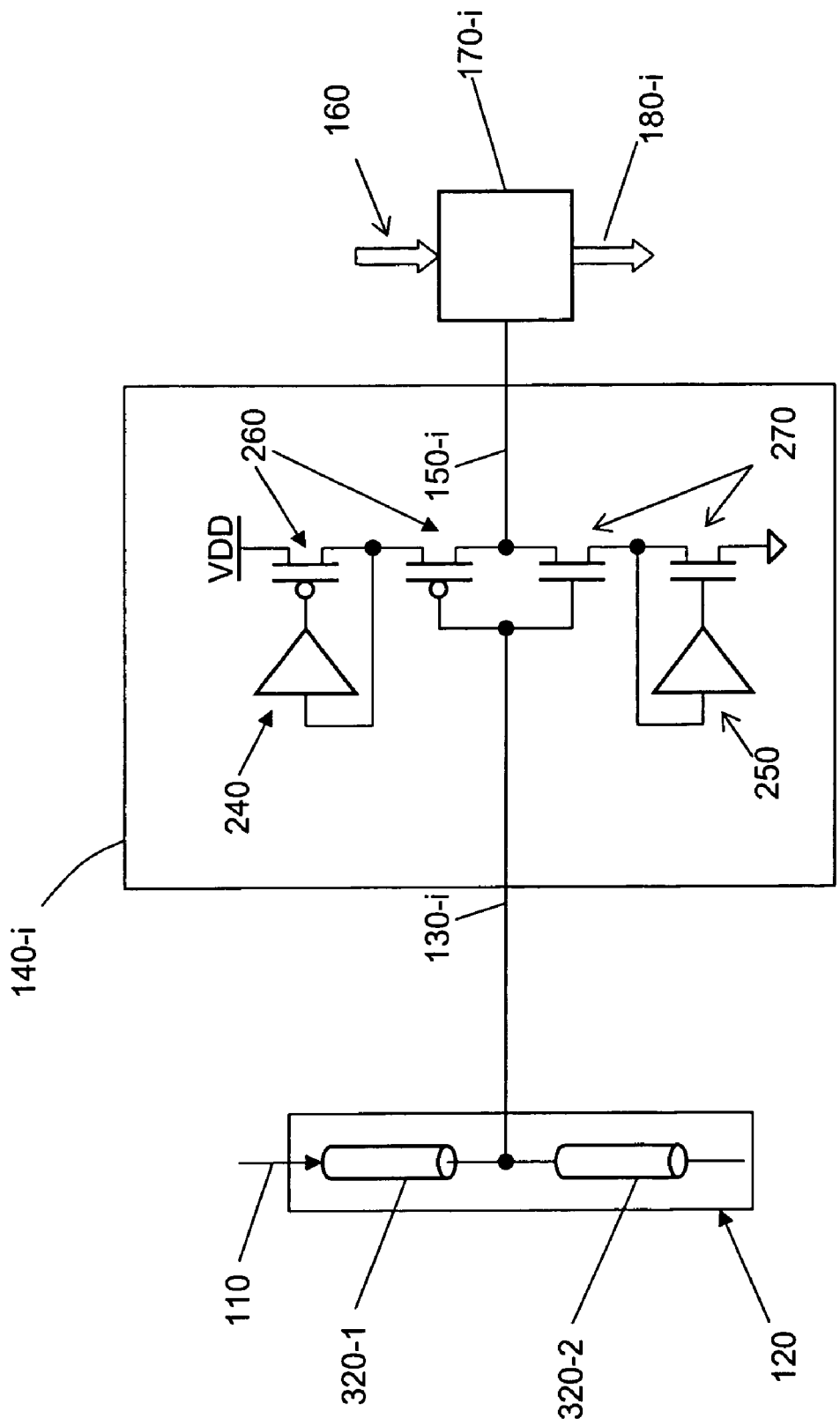
FIG. 3 is a block diagram of electrical delay line portions in connection with a single distributed amplifier stage connected to a respective modulating element.

The velocity of the electrical signal propagating in the TL 120 is typically faster than the velocity of the optical wave propagating in the series of modulating elements 140-1 to 140-k. In order to match the overall velocity of the electrical signal in the TL 120 to the average optical velocity in the series of modulators, the TL 120 may be designed to have sufficient delay between the output ports to slow down the overall electrical signal to match the speed of the optical signal in the series of modulators. Accordingly, as illustrated in FIG. 3, the TL 120 can be designed to have a series of electrical delay lines 320. The TL 120 could be designed so that the input of each amplifier 140-i is connected to a respective one of the electrical delay lines 320. Additionally, the electrical delay lines 320 may be active electrical delay lines comprising of devices which can provide signal amplification such as transistors. The electrical delay lines 320 can also be passive delay lines comprising, for example, of circuit elements such as resistors, capacitors, inductors, transformers, and the like.

Generally, the characteristic impedance of a transmission line is determined by the intrinsic inductance and capacitance of metal lines associated with the transmission line. However, when circuit elements such as amplifiers having lumped input capacitances are connected to the transmission line, the characteristic impedance of the transmission line is affected by the input capacitance of such circuit elements. Thus as one or more amplifiers are connected to various points of a transmission line, such as the TL 120, characteristic impedance may change along the length of the TL 120. This may result in impedance discontinuities along the length of the TL 120.

Figure 3A:
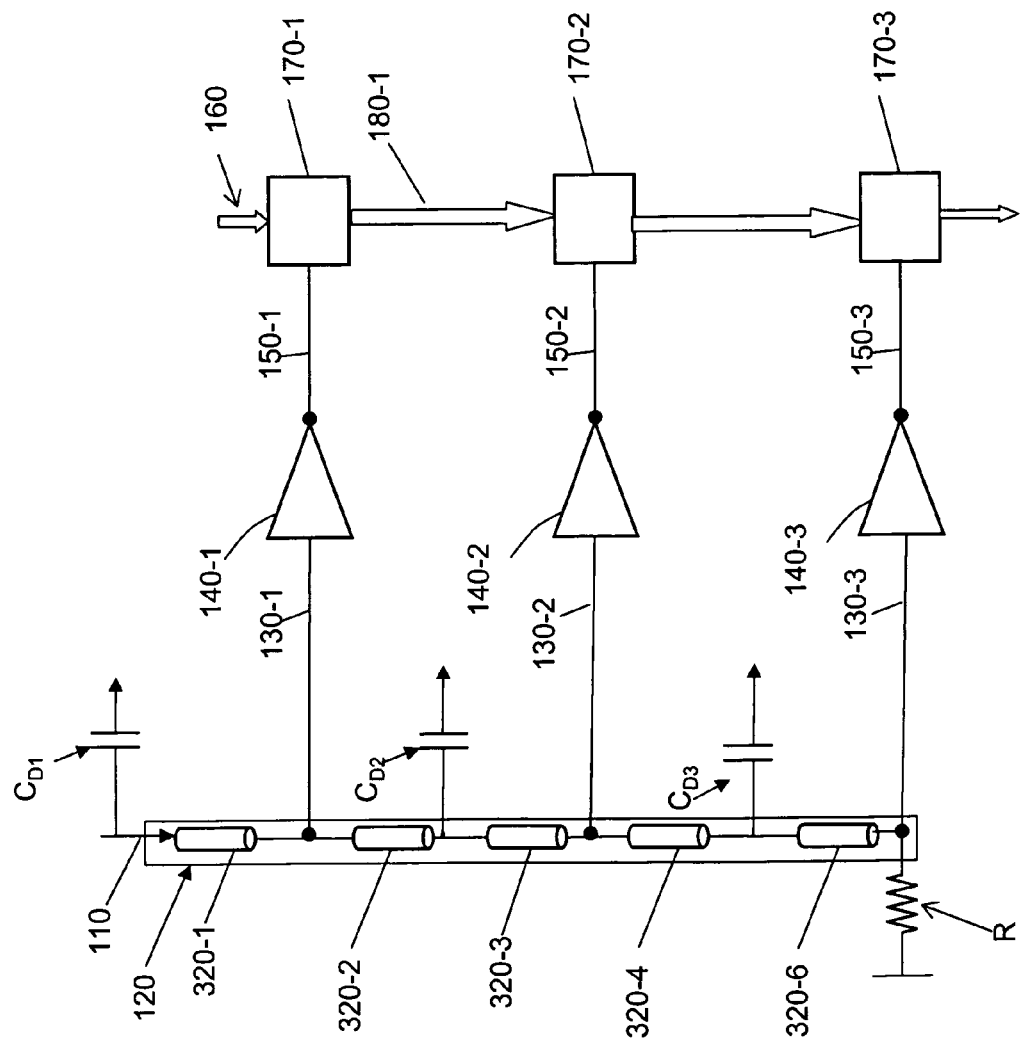
FIG. 3A is a block diagram of electrical delay line portions in connection with multiple capacitors and multiple distributed amplifier stages connected to respective modulating elements.

To reduce the effects of impedance discontinuities along the TL 120, one or more capacitors may be connected to the TL 120, as illustrated in FIG. 3A. Connecting these capacitors ensures a more uniform distribution of capacitance along the length of the TL 120 and thus results in a reduction of impedance discontinuities along the length of the TL 120. Transmission lines having a large number of lumped capacitive loads generally have lower characteristic impedances. Additionally, due to more frequent distribution of lumped capacitors, their performance is closer to ideal transmission lines.

As illustrated, capacitors $C_{D1}$-$C_{D3}$ can be connected to the TL 120 between any two inputs nodes of the distributed amplifiers 140-1 to 140-3. In this embodiment, the capacitors are connected to the TL 120 at uniform intervals such that they are located at a same distance from one other. The capacitors are generally connected between various electrical delay lines 320. Thus, one or more capacitors can be disposed between any two amplifier stages. Other configurations are also possible. For example, in one embodiment, the capacitors are connected to the TL 120 at non-uniform intervals such that not all of the capacitors are located at same distances from one another.

In certain embodiments, the capacitors $C_{D1}$-$C_{D3}$ are selected such that their capacitance is equivalent to the input capacitance of the amplifiers. In other embodiments where the amplifier stage includes a smaller input stage and a larger output stage, the input stage itself may be used as a capacitive load to achieve better capacitance matching. However, before being used as a capacitive load, generally the input stage is powered-down so that it does not consume a large amount of power. The capacitors may be a metal-oxide-semiconductor capacitor, a metal-insulator-metal capacitor, a fringe capacitor, a transistor, or other types of capacitors known in the art.

Figure 4:
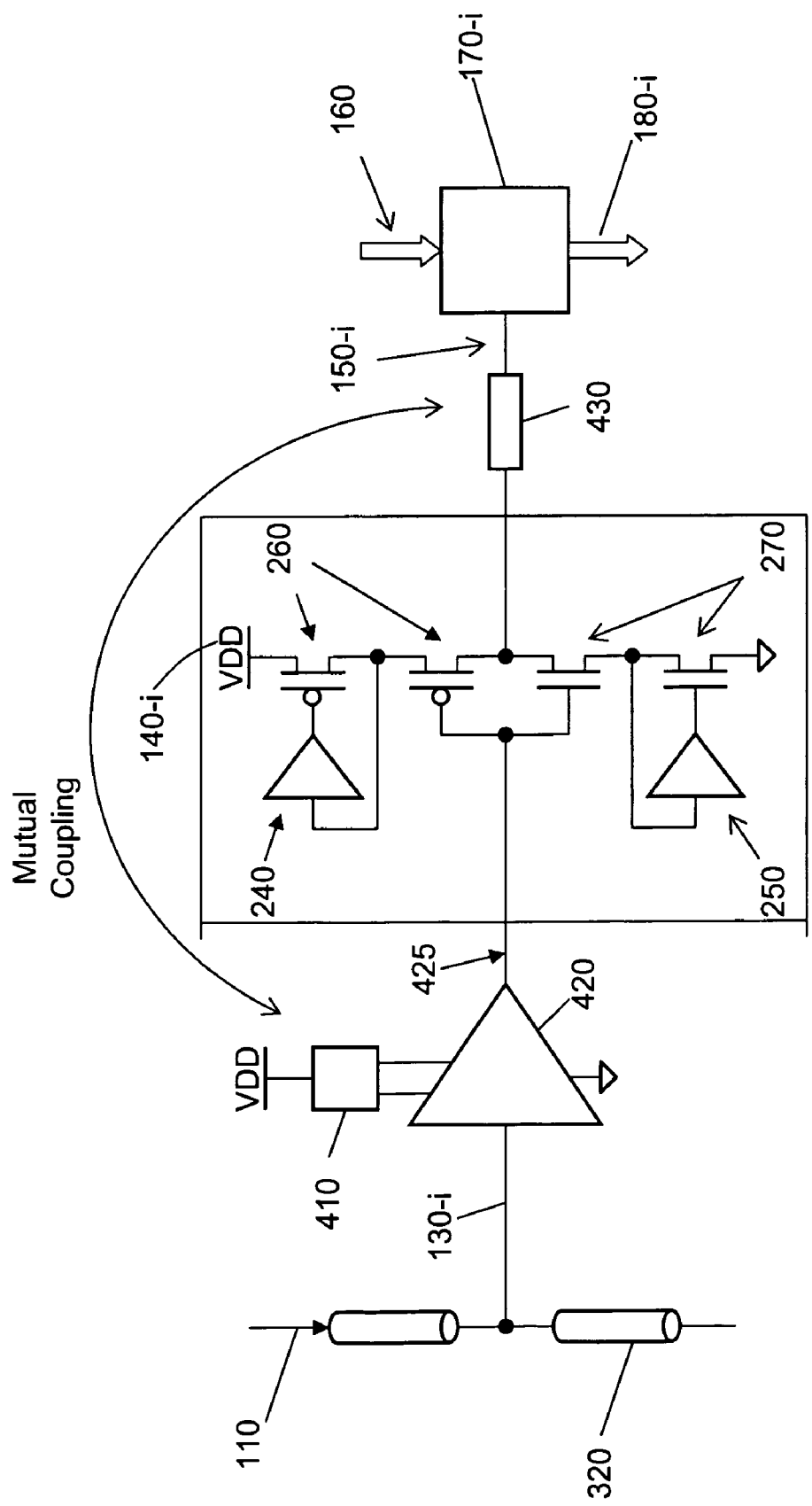
FIG. 4 is a block diagram of an alternative embodiment of a distributed amplifier connected to a respective modulating element that employs mutual coupling for increasing transition speed.

FIG. 4 illustrates a method of increasing transition speed in a DA optical modulator by mutually coupling two peaking networks. The peaking network 410 of FIG. 4 is connected to a predriver 420 which outputs an electrical signal 425 to the amplifier 140-$i$. On the output side of the amplifier 140-$i$, the peaking network 430 is disposed between the output port of the amplifier 140-$i$ and the electrical input port of the modulating element 170-$i$. This arrangement also results in mutual coupling between the predriver 420 and the peaking network 430 of the output stage. The advantages of mutual coupling are discussed more fully below. The peaking networks 410 and 430 may comprise of a single circuit element, such as a transformer or a group of individual inductors. In various embodiments, the inductors included in the peaking networks 410 and 430 can be placed in a concentric or overlapping pattern. Such arrangements create mutual magnetic flux coupling between the inductors. The polarity of this mutual coupling can be chosen such that high-frequency magnetic energy from the predriver 420 can be coupled into the amplifier 140-$i$ to achieve bandwidth extension.

In various preferred embodiments of the present invention, the predriver 420 is comprised of a differential amplifier followed by a differential to single ended converter. The converter converts the output of the differential amplifier to a single signal that can be input to the amplifier 140-$i$. Because there is only one signal that is input to the amplifier 140-$i$, only a portion of the differential amplifier used in the predriver 420 is needed for outputting the signal 425. Therefore, a portion of the differential amplifier including the branch that is not connected to the output stage is not used. The energy from this unused portion of the differential amplifier is coupled into the peaking network 430 to enhance transition speed. This can be achieved because, even though the branch may be unused, due to the balanced operation of the differential amplifier, a high frequency AC current may still flow through it. This current can be converted to magnetic energy by coupling an inductor (primary coil) of the peaking network 410 to an inductor (secondary coil) of the peaking network 430. The magnetic energy generated can be converted back to a current of the same polarity as the AC current in the peaking network 430.

The mutual inductive coupling is achieved in two ways. According to a small signal approach, the inductor resonates with the parasitic capacitance of the output node and to a certain extent cancels the parasitic capacitance. Parasitic capacitance is undesirable because it could create a pole resulting in a frequency roll-off in an amplifier driving a modulating element. Therefore, any effort to eliminate or neutralize the parasitic capacitance is desirable as it provides for operating at higher frequencies. According to a large signal approach, the inductor inhibits current changes at the output node and produces overshoot and undershoot. These effects are sometimes desirable because they assist in charging and discharging the parasitic capacitance of the modulating element. During signal switching, mutual coupling between stages helps to enhance the effects of the peaking inductor. This also translates to shorter rise time and fall time.

Although the preferred embodiments of the present invention involve inductive coupling, it is well known in the art that various different circuit elements and different configurations can be used to create the peaking networks 410 and 430 and the predriver 420. For example, capacitors can be used in the peaking networks 410 and 430, in which case instead of inductive coupling, capacitive coupling can be used. Combination of inductive and capacitive coupling may also be possible. Other variations may be used as well.

Figure 5:
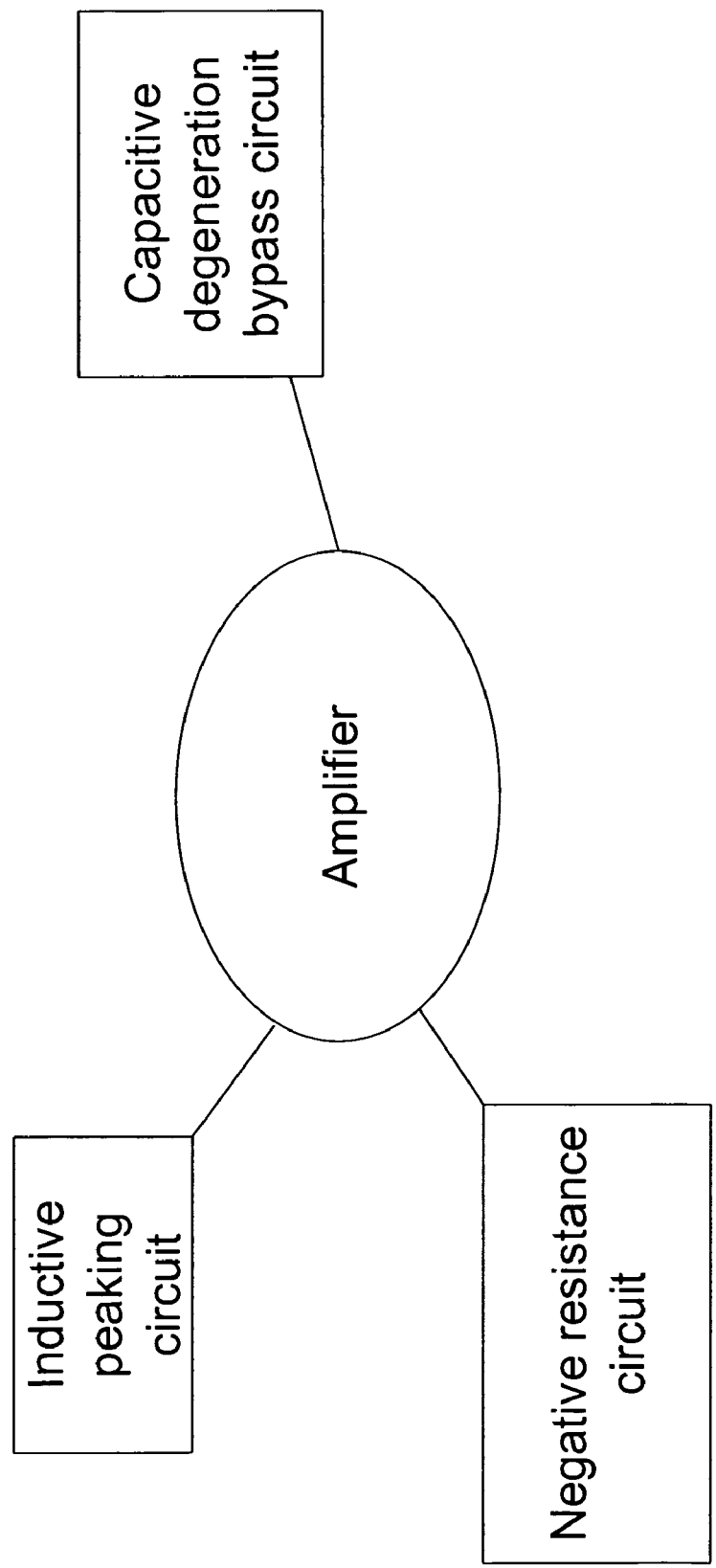
FIG. 5 is a diagram of bandwidth extension techniques that can be used in combination with the amplifiers discussed herein.

FIG. 5 illustrates some additional bandwidth extension techniques that when used in combination with any of the k amplifiers in a DA optical modulator can result in increased bandwidth extension in the DA optical modulator. These techniques include the use of inductive peaking described above and in more detail below with respect to FIGS. 6A and 6B, the use of capacitive bypass of resistive degeneration described in more detail below with respect to FIGS. 7A and 7B, and the use of a negative resistance cell, described in more detail below with respect to FIG. 8.

Figures 6A, 6B:
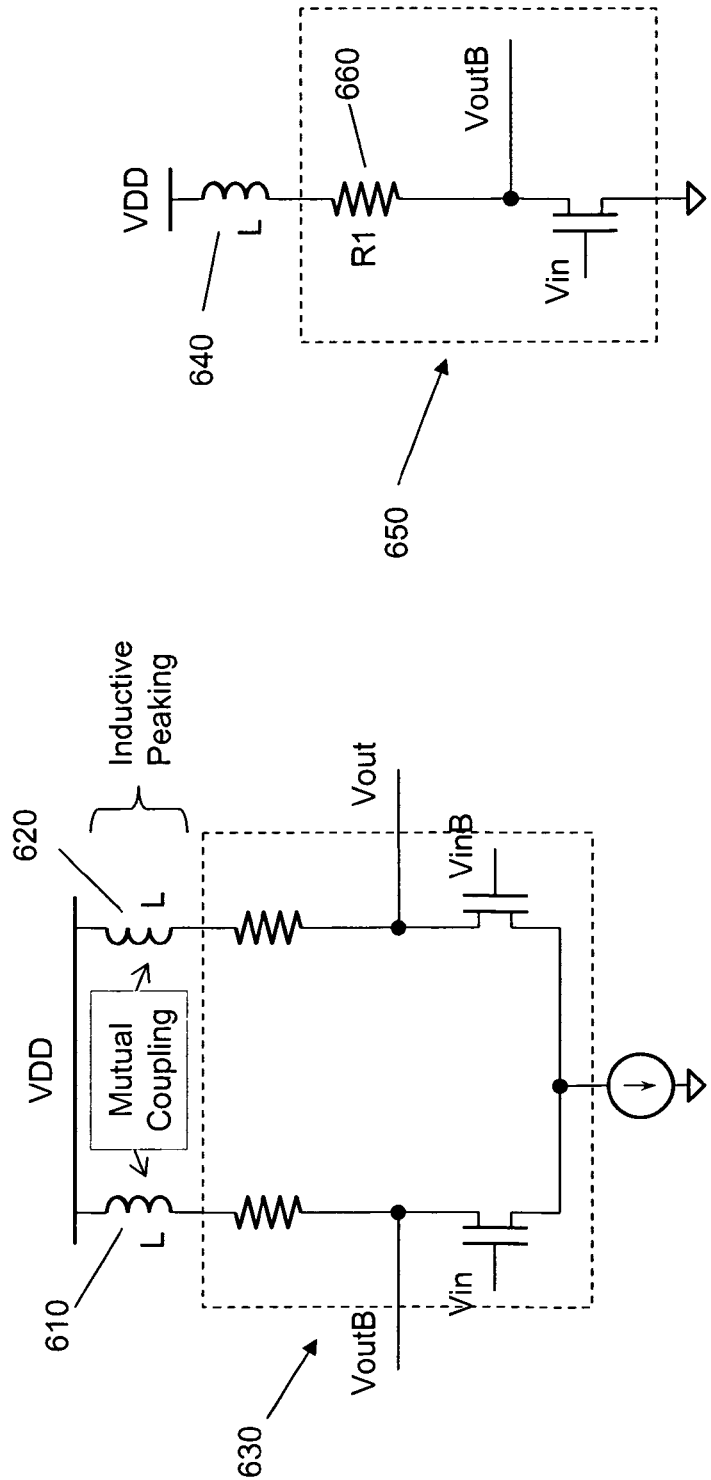
FIGS. 6A and 6B illustrate inductive coupling for a differential and a single ended amplifier, respectively.

FIGS. 6A and 6B are diagrams of two example circuits achieving bandwidth extension through inductive peaking. FIG. 6B shows how inductive peaking can be achieved with a single-ended amplifier by connecting an inductor 640 in series with a resistor 660 in an amplifier circuit 650. This technique when used in combination with any amplifier 140 of the DA optical modular can result in increased bandwidth extension and reduced circuit area.

FIG. 6A shows inductors 610 and 620 both having the same value of inductance, coupled to a differential amplifier 630. The two inductors create mutual inductive coupling and inductive peaking. Inductive peaking takes advantage of the fact that inductor impedance increases with frequency. Thus, a high frequency roll-off of an amplifier gain can be compensated by including inductors in series with resistors. In differential amplifiers, mutual inductive coupling can be used to increase bandwidth extension or reduce inductor area.

FIGS. 7A and 7B are diagrams of two example circuits that achieve bandwidth extension through capacitive bypass of resistive degeneration. As shown in FIG. 7A, a capacitor 750 is used to bypass the resistance of resistors 760 and 780. Generally, the resistors 760 and 780 degenerate the circuit gain. This is because generally degeneration resistors reduce amplifier gain. However, when, a capacitor is placed in parallel with the resistors, the collective impedance of the RC combination can decrease at high frequencies. When the reduction in gain degeneration at high frequencies coincides with the gain roll-off that is due to circuit poles, the circuit achieves a relatively constant gain. The reduction in gain degeneration increases gain and the gain roll-off reduces gain. These two effects offset each other and result in a relatively constant bandwidth extension for the circuit. When the capacitor 750 is added to the circuit shown in FIG. 7A, the resistors 760 and 780 are bypassed at high frequencies. Therefore, at high frequencies the gain degeneration is bypassed and gain is restored to its original value. This process results in bandwidth extension at high frequencies. FIG. 7B shows how capacitive bypass of resistive degeneration can be achieved with a single-ended amplifier by connecting a capacitor C in parallel with a resistor R2. This technique of capacitive bypass of resistive degeneration can be used in combination with any amplifier 140 (see FIG. 1) of the DA optical modular to create increased bandwidth extension.

Figure 8:
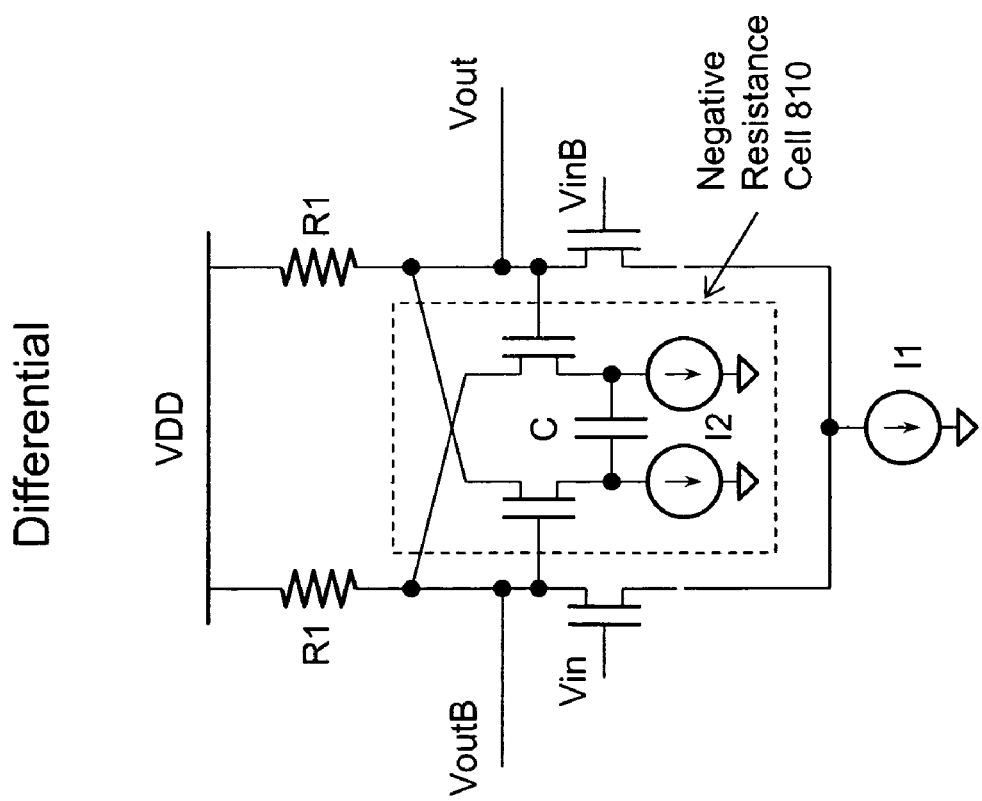
FIG. 8 illustrates a negative resistance cell for a differential amplifier.

FIG. 8 is a diagram of an example circuit that achieves bandwidth extension by using a negative resistance cell. A negative resistance cell is a combination of circuit elements for which the current and voltages produced across its terminals represent a negative resistance. The use of a negative resistance cell could result in increased speeds for signal transitions at high frequencies and in turn in bandwidth extension. A negative resistance cell when used in combination with any amplifier 140 of FIG. 1 of the DA optical modular could result in increased bandwidth extension.

Figure 9A:
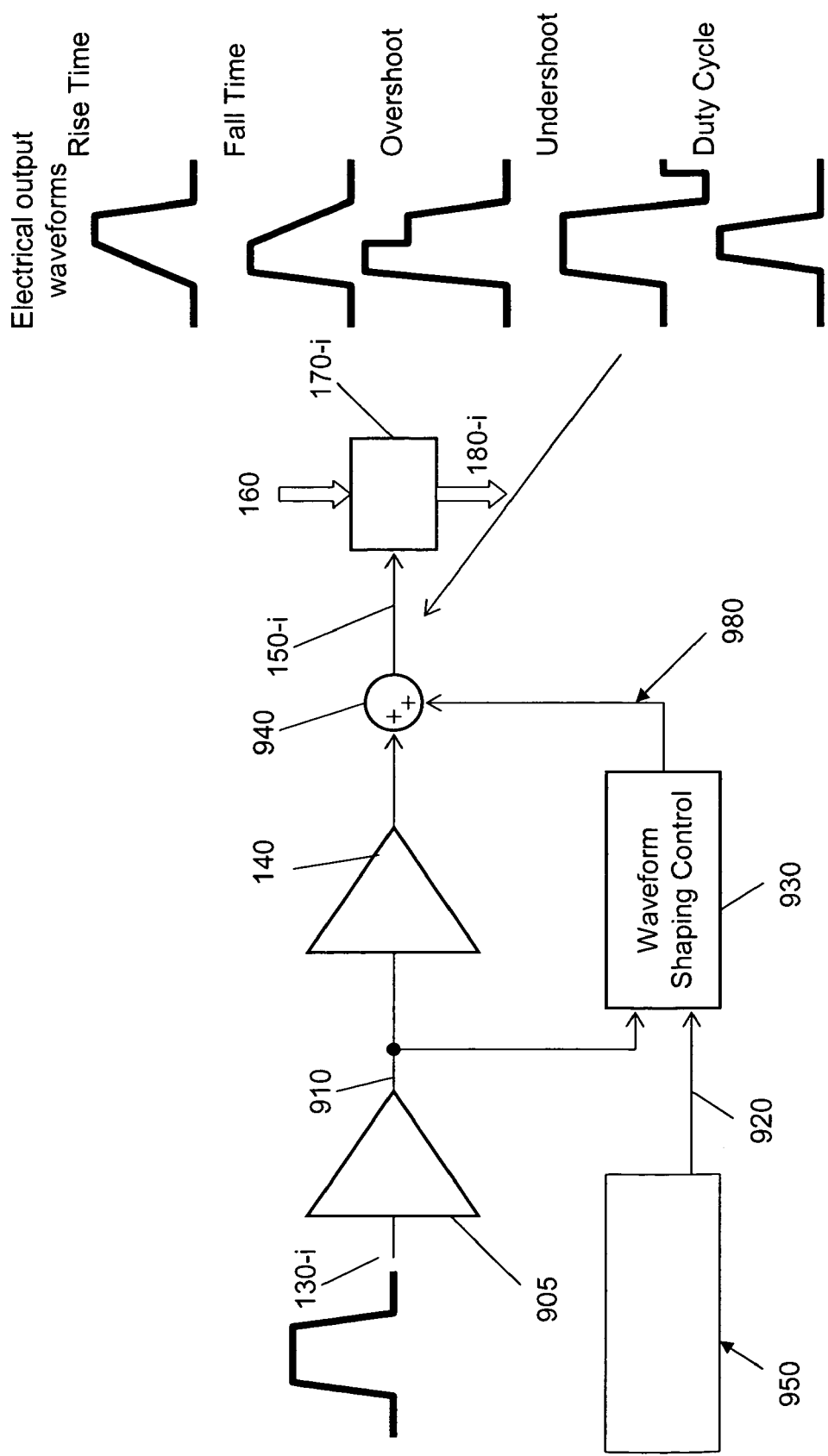
FIG. 9A is a block diagram illustrating a method of incorporating waveform shaping circuitry with a distributed amplifier connected to a respective modulating element.

The distributed amplifiers of the DA optical modulator 100 can also be equipped with waveform shaping circuitry for the purpose of improving circuit performance and compensating for waveform non-idealities in the optical modulating elements. FIG. 9A shows a block diagram of a circuit incorporating such waveform shaping circuitry. The modulating signal 130-$i$ of FIG. 9A is input to a predriver 905 which in turn outputs a signal 910. The signal 910 is input to both the amplifier 140 and a waveform shaping control 930. The waveform shaping control 930 also receives a waveform shaping adjustment signal 920. The waveform shaping adjustment signal 920 maybe a binary waveform that is created by a user's manual adjustment of a waveform control interface 950. For example, the waveform control interface 950 may allow the user to adjust various waveform characteristics of the modulating signal 130-$i$, such as the rise time, fall time, overshoot, undershoot, or duty cycle. In certain embodiments each of the adjustable waveform characteristics can be adjusted independent of the others. In other embodiments, adjusting one characteristic may result in adjustment of other characteristics. For example, adjusting the rise time may result in adjustment of overshoot and vice versa, and adjusting the fall time may result in adjustment of undershoot and vice versa. Various other arrangements are also possible.

The waveform shaping control 930 may include a digital decoder capable of decoding the binary adjustment signal 920. After decoding the adjustment signal 920, waveform shaping control 930 may use the decoded signal to adjust specific waveform characteristics of the modulating signal 130-$i$. An adjusted signal 980 may then be outputted from the waveform shaping control 930 to a summing unit 940. The summing unit 940 can sum the adjusted signal 980 with the output of the amplifier 140-$i$. The final modified modulating signal 150-$i$ may then be input to the modulating element 170-$i$ to modulate the optical wave 160. The amplifier 140 of FIG. 9 can be any type of the variety of amplifiers known in the art and is not limited to a push-pull amplifier. Other variations are also possible.

Figure 9B:
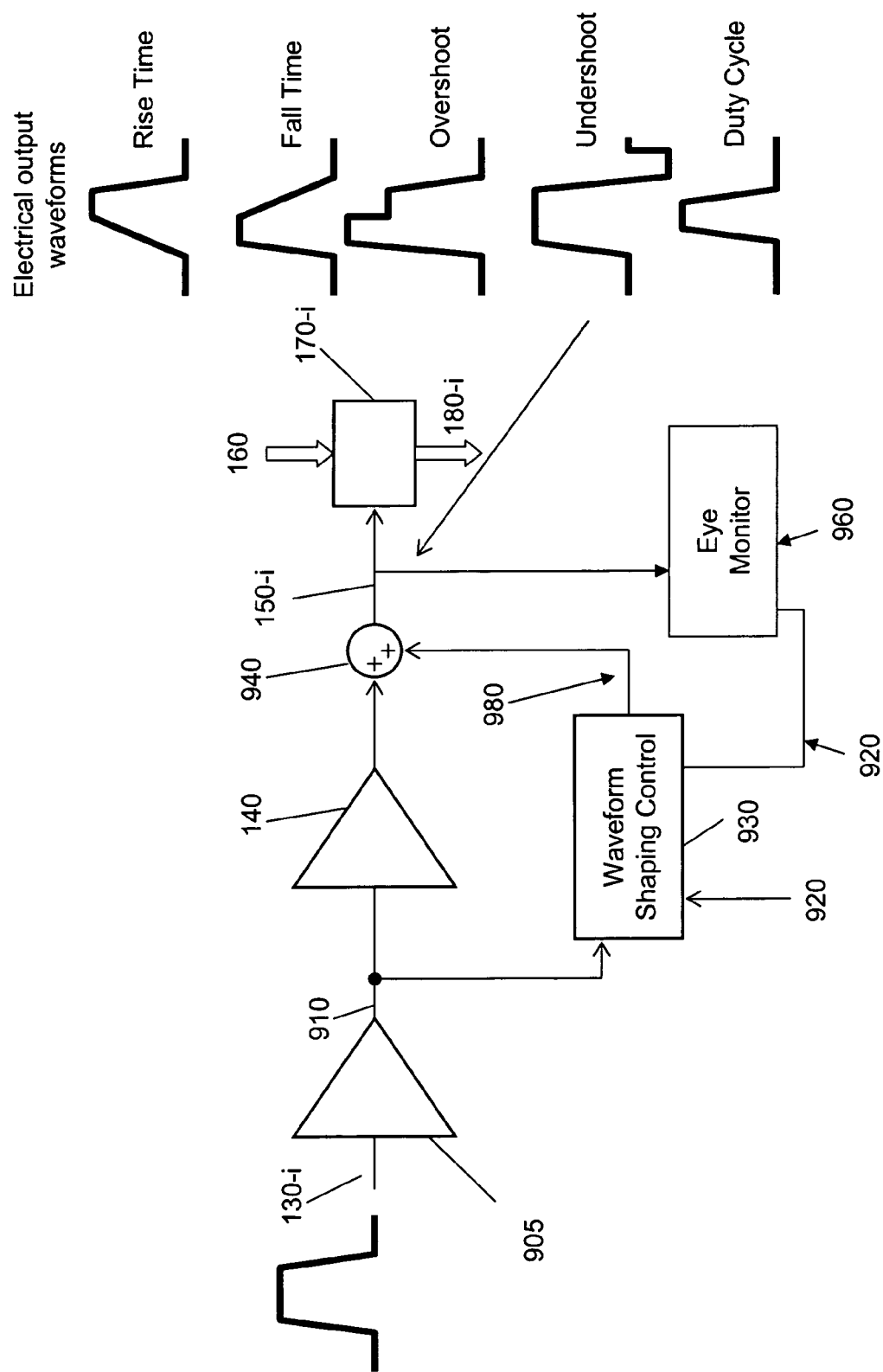
FIGS. 9B and 9C are block diagrams illustrating alternative methods of incorporating waveform shaping circuitry with a distributed amplifier connected to a respective modulating element.

In an alternative embodiment, a waveform monitoring circuit (eye monitor) can be used to monitor the characteristics of the output signal 150-$i$, as illustrated in FIG. 9B. The eye monitor 960 can monitor the output signal 150-$i$ and extract characteristic information, e.g., rise time, fall time, undershoot, overshoot, and duty cycle from the signal 150-$i$. This information is then provided to the waveform shaping control 930. The waveform shaping control 930 then compares the characteristic information of the signal 150-$i$ to preprogrammed desired waveform settings. Waveform shaping circuits within the waveform shaping control 930 are then adjusted to reduce the differences between the measured characteristics and the desired characteristics. The preprogrammed desired waveform settings can be defined in hardware or software or may be adjustable by a user. The latter approach is advantageous as it affords more flexibility. The use of feedback has an advantage of reducing sensitivity to variations in electrical and optical process parameters. In an alternative embodiment, the eye monitor 960 monitors the modulated optical signal 180-$i$ and the waveform shaping control 930 adjusts the waveform shaping circuits so that desired waveform characteristics are achieved in the optical signal 180-$i$. Other variations are also possible.

Figure 9C:
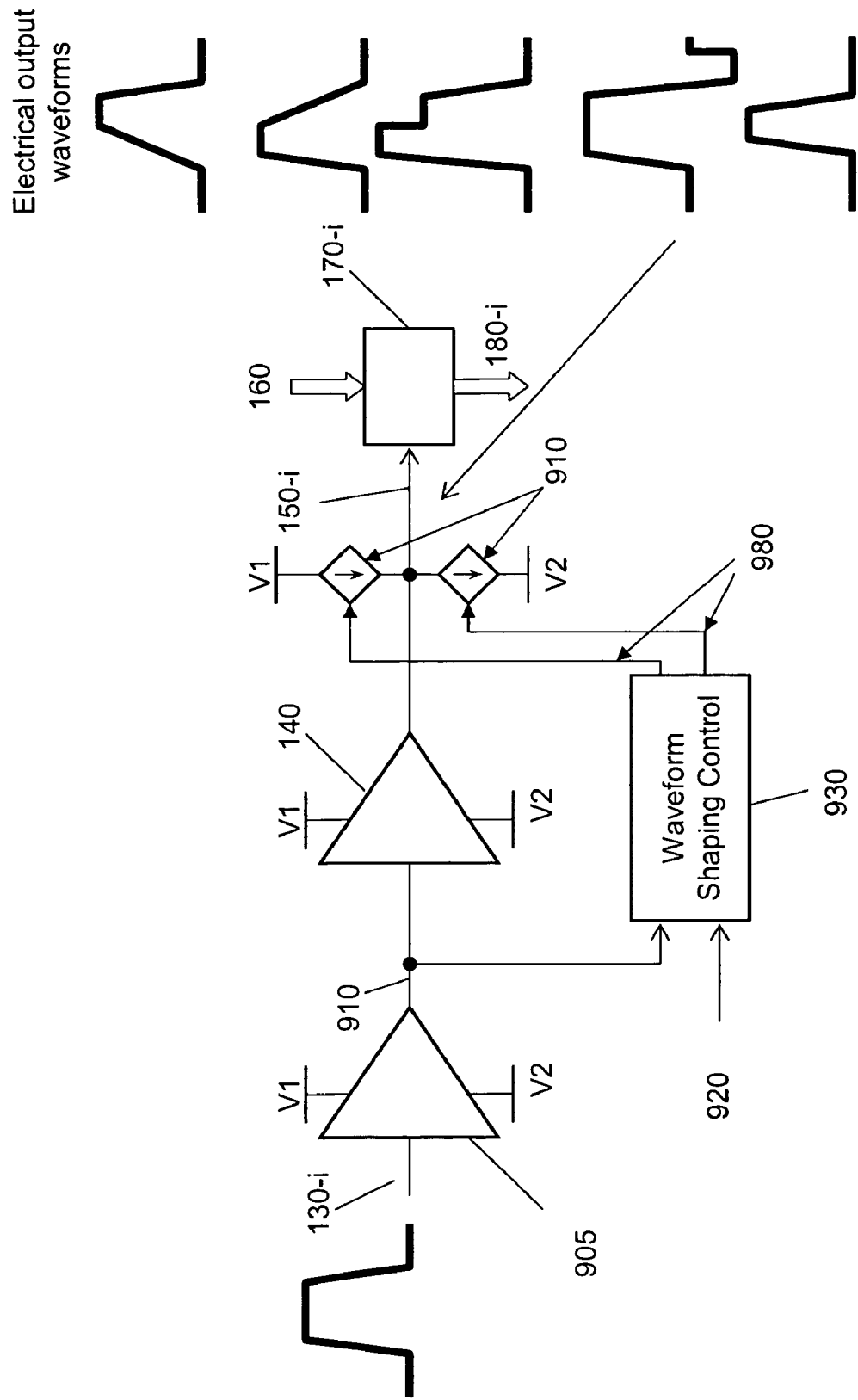

FIG. 9C illustrates an alternative embodiment for shaping the waveform characteristics of the modulating signal 130-$i$. The output 980 of the waveform shaping control 930 is input to two voltage controlled current sources 910. The current sources 910 can provide time-varying, data dependent currents to change the rate at which the modulating element 170-$i$ is charged or discharged. Consequently, transition times can be decreased or increased, and overshoot or undershoot can be introduced by turning on one or both of the sources. Additional alternative embodiments include using only one voltage controlled current source or using one or more current controlled voltage sources, voltage controlled voltage sources, or current controlled current sources.

Figure 10:
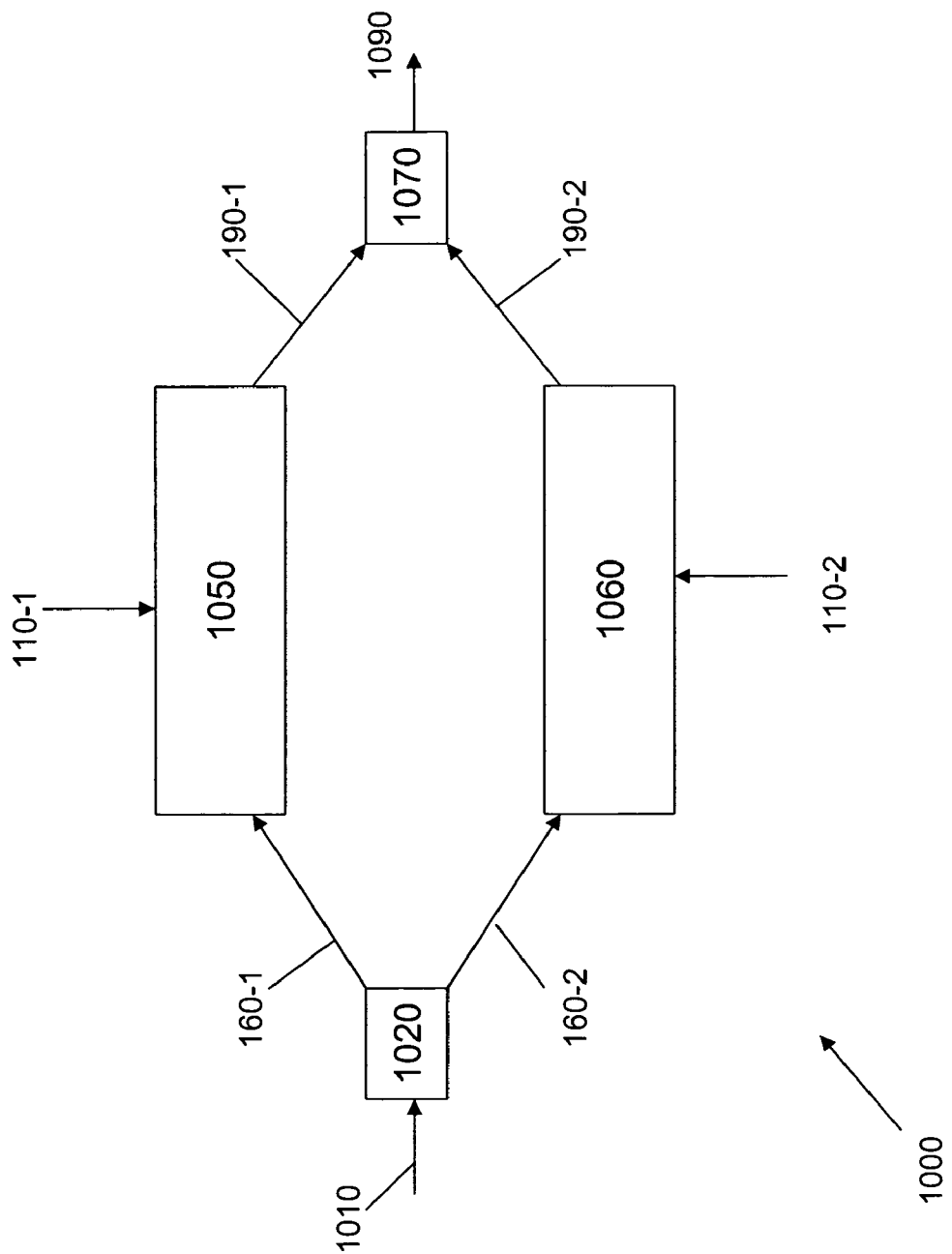
FIG. 10 is a block diagram of a Mach-Zender Interferometer.

FIG. 10 is a block diagram of a Mach-Zender Interferometer (MZI) 1000, incorporating two DA optical modulators. Optical wave 1010 having a specific frequency and amplitude is input to splitter 1020, which divides optical wave 1010 into two optical waves 160-1 and 160-2 propagating through a first and a second arm of the MZI 1000.

Optical wave 160-1 is input to DA modulator 1050, which can cause a phase shift in optical wave 160-1 and produce optical wave 190-1 as a result of applied electrical signal 110-1. Optical wave 160-2 is input to the DA modulator 1060, which can cause for example an opposite phase shift in optical wave 160-2 and produce optical wave 190-2 as a result of applied electrical voltage 110-2. Applied signal 110-2 may be the inverse of the modulating signal 110-1 which would result in a destructive interference. In some embodiments, the MZI modulator 1000 uses signals 110-1 and 110-2 as differential modulating signals, which can result in the cancellation of noise present in the modulating signal 110.

Modulated wave 190-1 and modulated wave 190-2 are summed in combiner 1070 to generate output 1090. Depending on the phase relationship between the two waves 190-1 and 190-2, combining the two waves can cause constructive or destructive interference, which can result in intensity modulated wave 1090. Amplitude modulation of optical wave 1010 is produced by the electrically controlled phase shifts in DA modulators 1050 and 1060.

Figure 11:
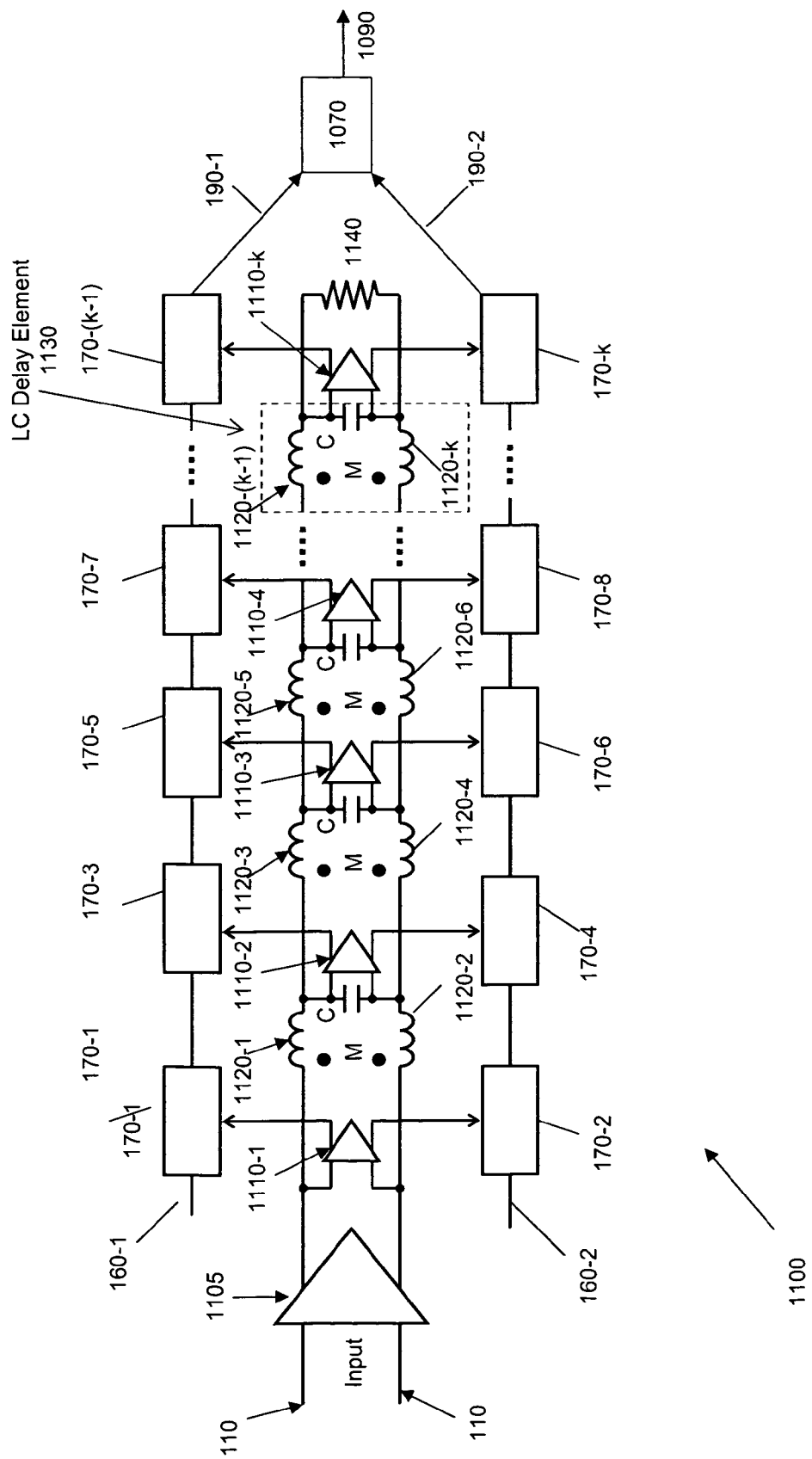
FIG. 11 is a block diagram illustrating a Mach-Zender Interferometer including a plurality of phase modulators driven by amplifiers connected to an artificial transmission line.

FIG. 11 is a block diagram of an MZI modulator, according to one embodiment of the present invention. The MZI modulator 1100 of FIG. 11 includes an artificial transmission line (ATL) instead of the electrical transmission line 120 shown in FIG. 1. The velocity of the electrical wave propagating in an electrical transmission line is typically not equal to the velocity of the optical wave propagating in the series of modulating elements 140. Therefore, an ATL can be used to match the propagation velocity of the electrical signal to that of the optical wave. Additionally, an ATL can offer a more compact footprint and can provide increased placement flexibility. The ATL of FIG. 11 is comprised of lumped LC delay elements 1130. The LC delay elements 1130 are generally comprised of two inductors 1120-($i$−1) and 1120-$i$ connected on one side to a capacitor C. The combination of the two inductors and the capacitor C tend to behave like a transmission line. The characteristic impedance $Z_0$ of the ATL that results from the combination of such LC delay elements is equal to the square root of L/C ($Z_0=\sqrt{L/C}$) and the delay of each LC element is equal square root of LC ($T=\sqrt{LC}$).

In various preferred embodiments of the present invention, the ATL is a differential ATL, as illustrated in FIG. 11. A differential ATL can take advantage of mutual magnetic coupling between inductors and also provides for differential capacitor placement. Mutual coupling between the inductors results in achieving the same effective inductance in a smaller area. Therefore, mutual coupling offers the ability to reduce the physical dimensions of the required inductors and capacitors. Although the LC delay elements shown in FIG. 11 are comprised of two inductors and a capacitor, it must be noted that a variety of different circuit elements and configurations can be used to create the LC delay elements that make up an ATL. For example, instead of the two inductors, two capacitors may be used to create capacitive coupling as opposed to inductive coupling. Various other arrangements are also possible.

The modulating signal 110 is run through an ATL driver 1105 and the output from the driver 1105 is input into the amplifiers 1110-1 to 1110-k. The amplifiers 1110-1 to 1110-k are differential amplifiers generally comprising of two push-pull amplifiers. The outputs from the two different arms of the amplifiers 1110-1 to 1110-k are input to corresponding modulating elements in the two arms of the MZI 1100. To prevent reflections and reduce their undesirable interference with the transmitted signal, a matching termination resistor 1140 is placed at the far end of the ATL. The resistor 1140 may absorb all of the electrical energy and not reflect any of the energy back. It is advantageous to design the MZI 1100 in such a way that the output impedance of the ATL driver 1105 matches the characteristic impedance of the ATL.

Figure 12:
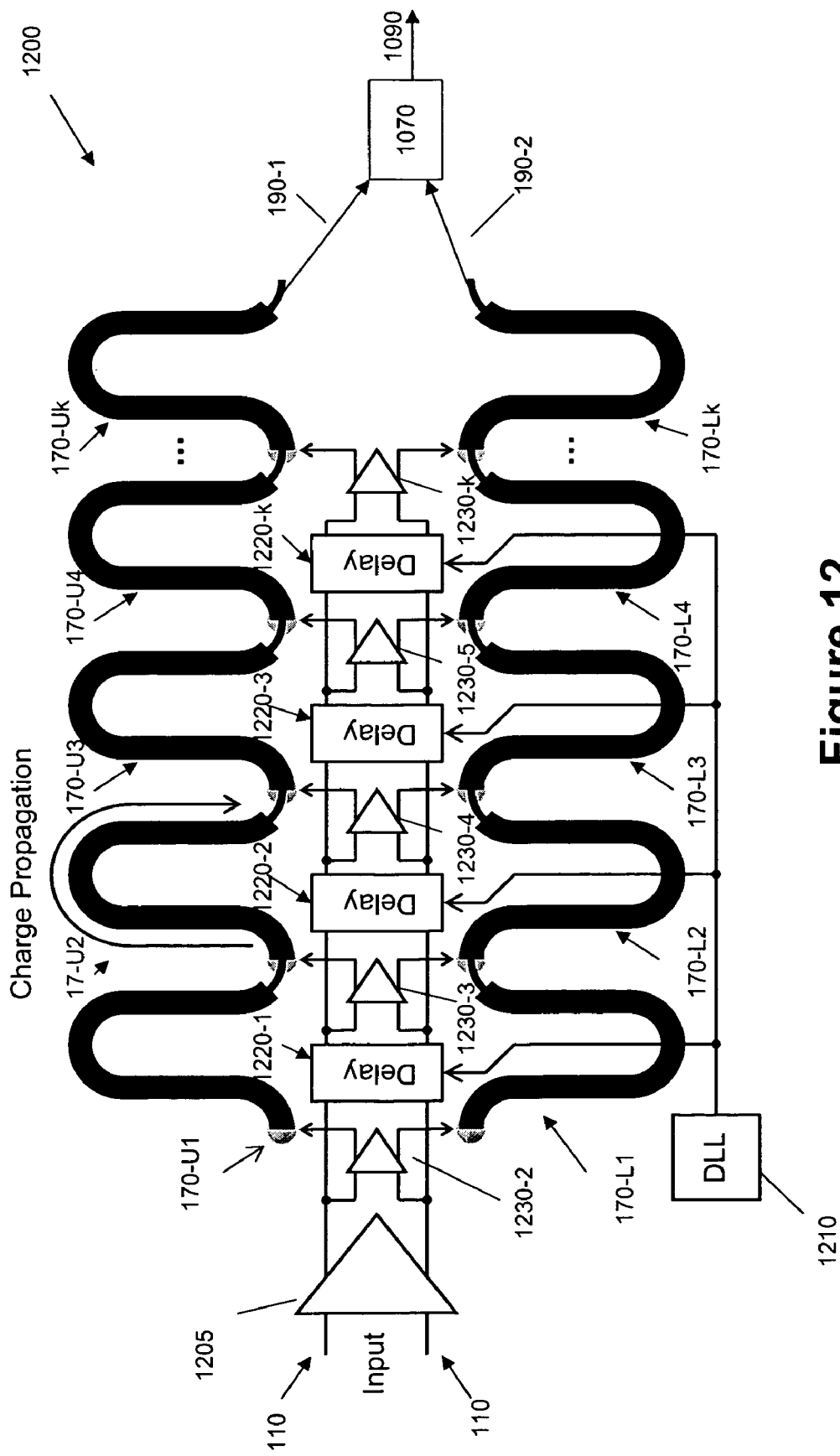
FIG. 12 is a block diagram illustrating a Mach-Zender Interferometer including a plurality of modulators driven by amplifiers connected to an active delay line.

FIG. 12 shows a block diagram of an MZI 1200 that uses an active delay line, instead of an actual electrical transmission line or an ATL. The use of an active delay line is advantageous because it can perform the same functionalities as an electrical transmission line, but requires a smaller area. The active delay line of various preferred embodiments of the present invention is comprised of multiple active delay elements 1220-1 to 1220-k. The delay of each active delay element is adjusted by a delay locked loop (DLL) 1210, the operation of which is described in more details with respect to FIGS. 13 and 14. The delay of the active delay elements is adjusted so that the velocity of the modulating signal traveling through the active delay line matches the velocity of the optical wave traveling through the modulating elements of the MZI 1200. The DLL 1210 uses either an internal or an external reference signal for the purpose of stabilizing delays of the active delay elements. The reference signal could be a periodic binary signal.

The modulating signal 110 is run through a driver 1205 and the output from the driver 1205 is input into an array of amplifier stages. As illustrated, the MZI 1200 has a first end and a second end, such that both the array of amplifier stages and the modulating elements in each of the first and the second arms of the MZI 1200 progress from the first end to the second end. The modulating signal that is input into the first amplifier stage 1230-2 is delayed by the delay element 1220-1 before being input into the next amplifier in the array of amplifier stages in the MZI 1200. As the modulating signal moves from the first end of the MZI 1200 to the second end, it is input sequentially into each one of the delay elements 1220-1 to 1220-k and it may be further delayed by each one of these delay elements.

The amplifiers 1230-2 to 1230-k are differential amplifiers and generally comprise two push-pull amplifiers. The outputs from the two different arms of the amplifiers 1230-2 to 1230-k are input to corresponding modulating elements in the two arms of the MZI 1200, such that the first amplifier stage drives the first upper and the first lower modulating elements 170-U1 and 170-L1, and the second amplifier stage drives the second two modulating elements in each of the first and the second arms of the MZI 1200. This process is repeated from the first end to the second end such that as the modulating signal moves from the first end to the second, each of the amplifiers in the array of amplifier stages drives a corresponding upper and lower modulating element from the first end to the second end.

To take advantage of the smaller area needed by the active delay line as compared to an electrical transmission line, the optical wave and associated optical modulating elements can be nonlinear, meandered, or folded, as illustrated in FIG. 12. Each of the separated curved shaded areas in FIG. 12 represents one of the modulating elements 170-U1 to 170-Uk or 170-L1 to 170-Lk. In this embodiment, the arms of the MZI 1200 follow a sinusoidal path. The arms, however, may be different and can have different shapes. For example, the arms may follow a path having turns that are less sharp than the sinusoidal path shown in FIG. 12. Other shapes may also be used. These shapes may be curved or comprise linear portions. In various embodiments, the arms undulate many times, e.g., 3, 4, 5, 6, 10, 20, or more times. Accordingly, the path that the arms follow shifts laterally many times along a longitudinal direction to increase the optical path length for a given length of the MZI 1200. This arrangement can reduce the required size of the MZI 1200 and provide increased placement flexibility for placing the MZI.

Figure 12A:
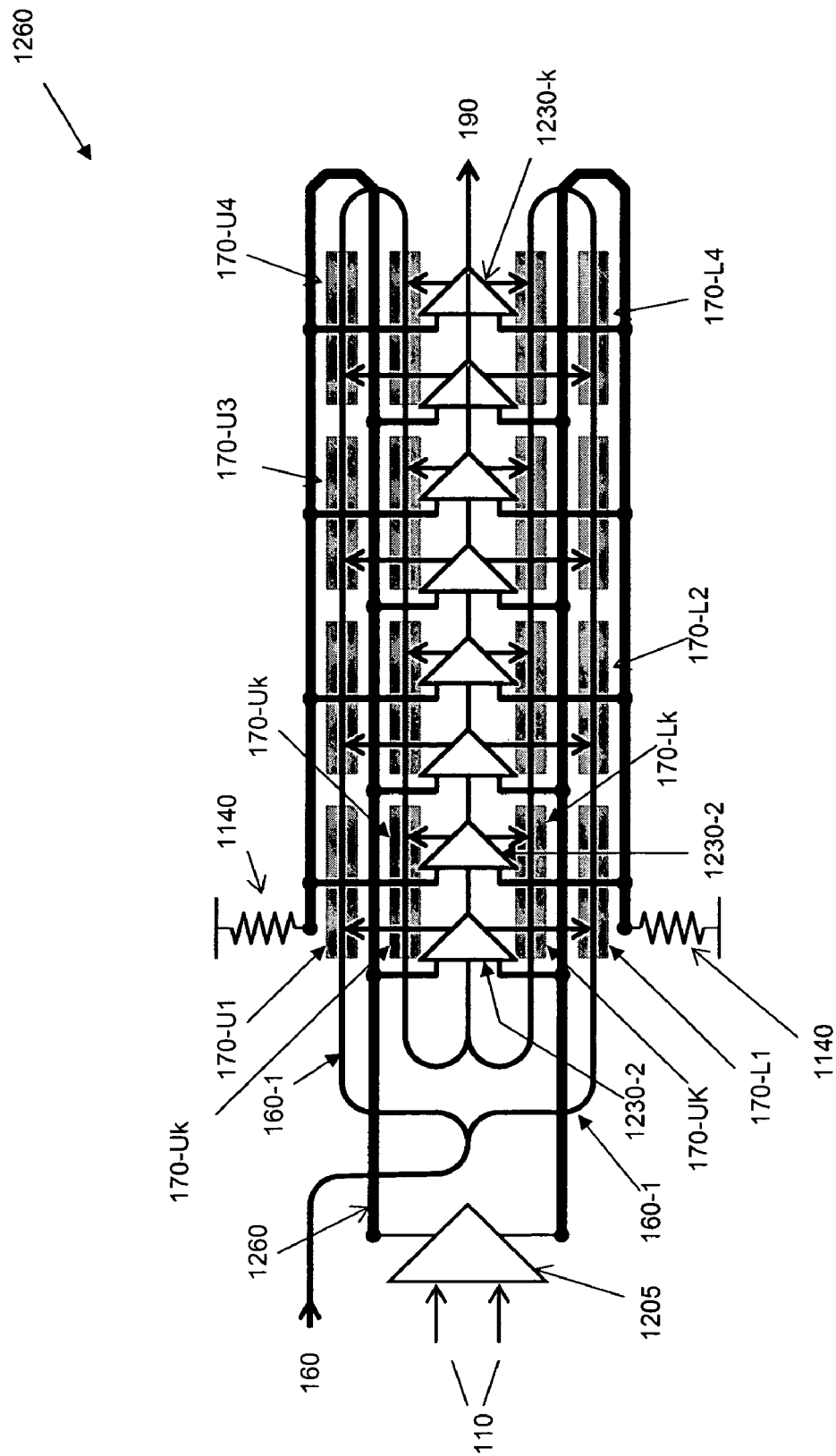
FIGS. 12A-12B are block diagrams illustrating a Mach-Zender Interferometer with folded modulators.

In other embodiments, the traveling path of both the optical wave and the modulating signal may be folded back, as illustrated in FIG. 12A. With this arrangement the velocity of the modulating signal traveling through the delay line can substantially match the velocity of the optical wave traveling through the modulating elements of the MZI 1260. In FIG. 12A, each of the separated rectangular shaded areas represents one of the modulating elements 170-U1 to 170-Uk or 170-L1 to 170-Lk. As illustrated, the MZI 1260 of FIG. 12A has a first end and a second end, such that the array of amplifier stages progress from the first end to the second end. It should be noted that line 190 is an optical path and not an electrical line and it is not connected to the amplifiers 1230-2 to 1230-k. Line 190 is generally placed on a layer either above or below the layer the amplifiers 1230-2 to 1230-k are placed on.

The optical modulating elements in the first arm of the MZI 1260 are optically connected and follow an optical path from the first end to the second end in a first row of the first arm and then back from the second end to the first end in a second row of the first arm. The first row of the first arm is the row of modulating elements containing modulating elements 170-U1 to 170-U4 and the second row of the first arm is to the row containing the modulating elements 170-U5 to 170-Uk. The optical modulating elements in the second arm of the MZI 1260 are optically connected and follow an optical path from the first end to the second end in a second row of the second arm and then back from the second end to the first end in a first row of the second arm. The first row of the second arm is the row of modulating elements containing modulating elements 170-L1 to 170-L4 and the second row of the second arm is to the row containing the modulating element 170-L5 to 170-Lk. Thus, as illustrated in FIG. 12A, each of the optical waves 160-1 and 160-2 traveling through the first and the second arms of the MZI 1260 follow a path from the first end to the second and then back from the second end to the first end. Accordingly, the optical waves travel through multiple rows that are substantially parallel. In this embodiment, each of the first and the second arms of the MZI 1260 are folded back and undulate once. In certain configurations, however, the arms may undulate two or more times and the rows need not be linear or parallel.

As illustrated, as the amplifiers progress from the first end to the second end, adjacent amplifiers do not drive consecutive optical modulators in the two arms of the MZI 1260. Adjacent amplifiers, generally, drive modulating elements that are in two different rows of each of the arms of the MZI 1260. For example, the first amplifier stage 1230-2 drives the first upper and lower modulating elements 170-U1 and 170-L1, but the second amplifier stage 1230-3 does not drive the second upper and lower modulating elements. Instead, the second amplifier stage 1230-3 drives the last upper and lower modulating elements 170-Uk and 170-Lk. Thus, the first two amplifier stages from the left of the MZI 1260 drive the first modulating elements from the left in both of the first and the second rows of both the first and the second arms of the MZI 1260. The second two amplifier stages from the left drive the second modulating elements from the left in both of the first and the second rows of both the first and the second arms of the MZI 1260. This process continues such that the next two amplifier stages from the left drive the next corresponding modulating elements in both the first and the second rows of both the first and the second arms of the MZI 1260. Thus, the first amplifier stage drives modulating elements that are located earlier, upstream or rearward in the optical path and the second amplifier stage drives modulating elements that are located later, downstream or forward in the optical path.

Because spatially consecutive amplifiers do not drive spatially consecutive modulating elements, the modulating signal is delayed by a different amount at each one of the different amplifier stages. For example, because the first amplifier stage drives earlier upstream modulating elements, the second amplifier stage drives later downstream modulating elements, and the third amplifier stage drives modulating elements that are in between the earlier upstream and the later downstream modulating elements, the modulating signal is delayed more by the second amplifier stage than by the third amplifier stage. Thus, as the modulating signal progresses from the first end to the second end, the amount of delay applied to the signal generally increases and decreases at consecutive amplifier stages. This applied delay is generally from the folded back transmission line.

Figure 12B:
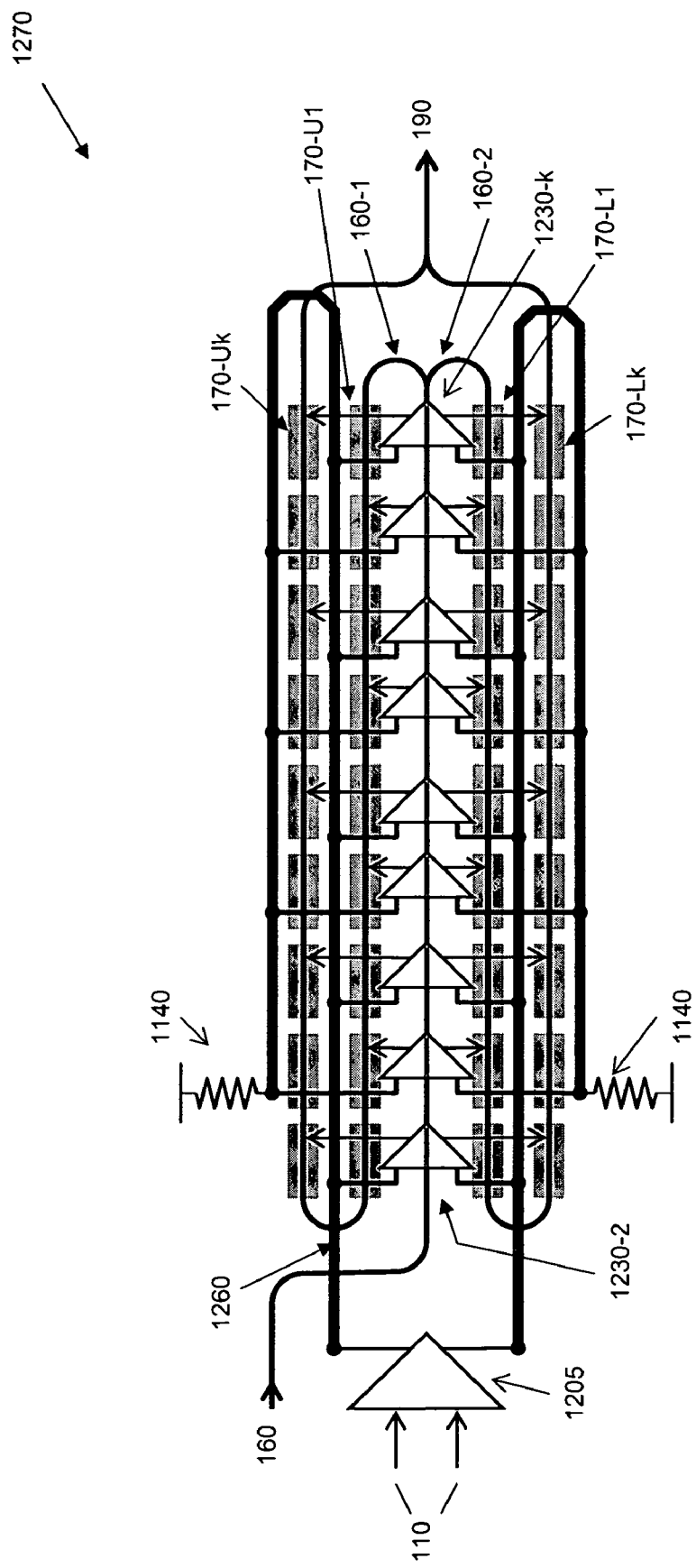

As FIG. 12A illustrates, the MZI 1260 is folded in half. Various other configurations are possible. For example, in some embodiments, the MZI may be folded three or more times to further reduce the size of the MZI 1260. Other embodiments are also possible. For example, FIG. 12B illustrates an alternative embodiment of the MZI 1260. The difference between the MZI 1270 of FIG. 12B and the MZI 1260 of FIG. 12A is the direction of travel of the optical waves. In the MZI 1260 of FIG. 12A, the optical wave 160-1 first travels from the first end to the second end in the first row of the first arm and then it travels back from the second end to the first end in the second row of the first arm, and the optical wave 160-2 first travels from the first end to the second end in the second row of the second arm and then it travels back from the second end to the first end in the first row of the second arm. However, in the MZI 1270 of FIG. 12B, the optical wave 160-1 first travels from the second end to the first end in the second row of the first arm and then it travels back from the first end to the second end in the first row of the first arm, and the optical wave 160-2 first travels from the second end to the first end in the first row of the second arm and then it travels back from the first end to the second end in the second row of the second arm. Thus, as illustrated, the optical wave 160 of the MZI 1260 follows an optical path that is split at the first end and recombined again at the first end, while the optical wave 160 of the MZI 1270 follows an optical path that is split at the first end and recombined at the second end. It should be noted that line 160 is an optical path and not an electrical line and it is not connected to the amplifiers 1230-2 to 1230-k. Line 160 of the MZI 1270 is generally placed on a layer either above or below the layer the amplifiers 1230-2 to 1230-k are placed on.

Figure 13:
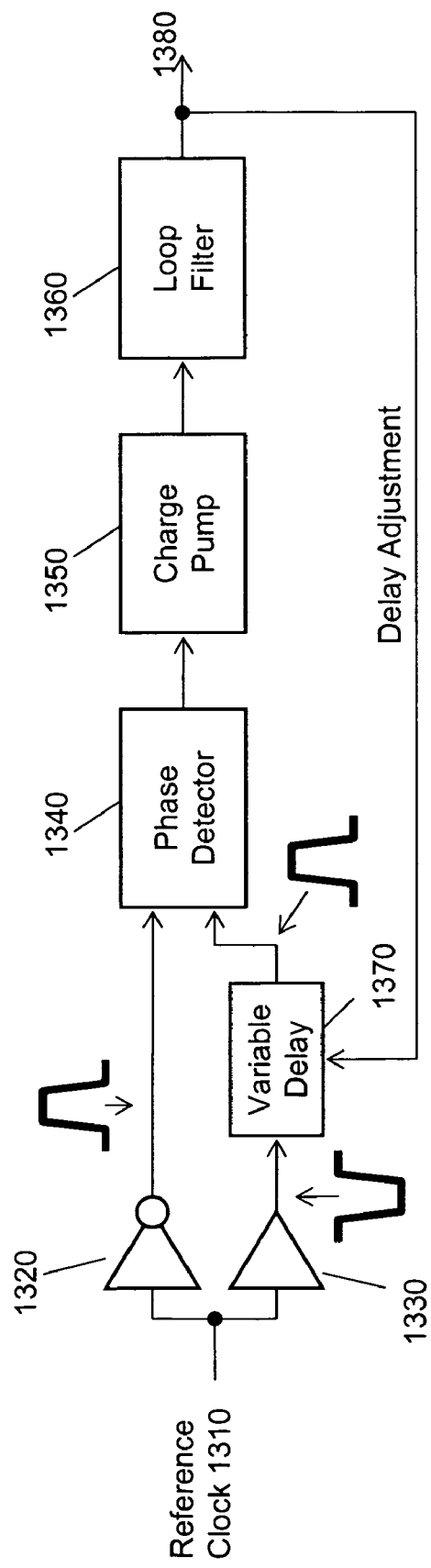
FIG. 13 is a block diagram illustrating the use of a reference clock signal in a delay locked loop for stabilizing variable delay elements.

FIG. 13 illustrates the use of a reference clock signal in a DLL for stabilizing variable delay elements. The reference signal used in FIG. 13 is a reference clock signal 1310. The reference clock signal 1310 is input to a variable delay cell 1370 which also receives a delay adjustment signal 1380. The output of the variable delay cell 1370 is compared to the clock's inverted waveform in the phase detector 1340. The phase detector 1340 outputs an error signal corresponding to the phase difference between the output of the variable delay cell 1370 and the clock's inverted waveform. The error signal of the phase detector is run through a charge pump 1350 where it is converted into current pulses. The current pulses are input to a loop filter 1360. The loop filter 1360 is generally a low pass filter used to assure that the phase adjustments are sufficiently slow. This process achieves increased gain for the phase control loop and generally reduces the steady state error. The loop filter 1360 outputs a delay adjustment signal 1380. This delay adjustment signal is sent to the active delay elements 1220-1 to 1220-k of FIG. 12 and is also fed back to the variable delay element 1370.

Figure 14:
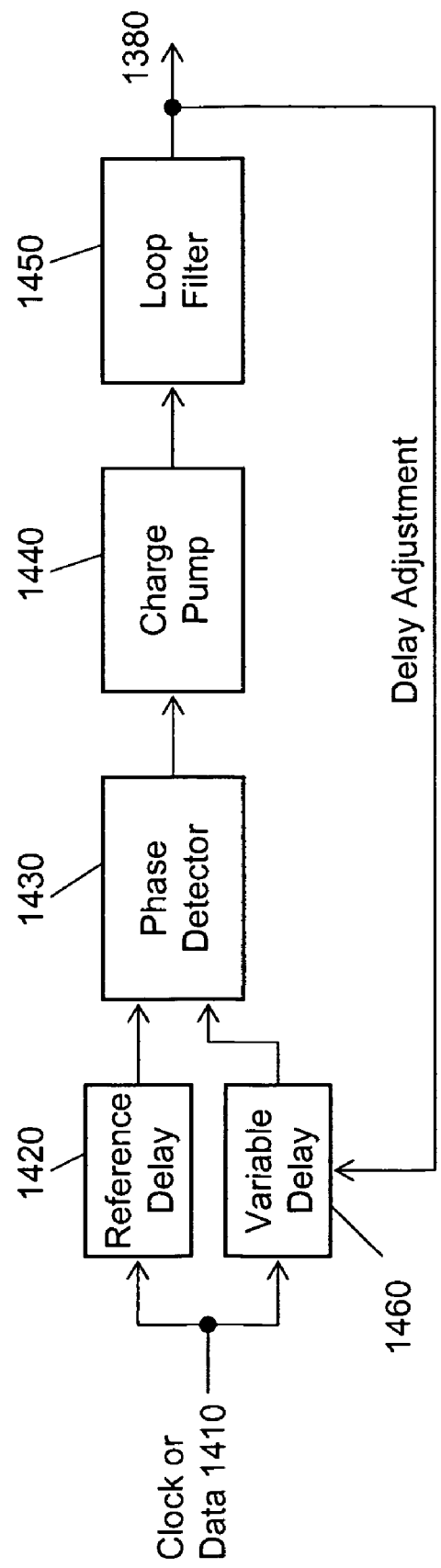
FIG. 14 is a block diagram illustrating the use of a reference delay block in a delay locked loop for stabilizing variable delay elements.

FIG. 14 illustrates the use of a reference delay block in a DLL for stabilizing variable delay elements. The reference delay block 1420 of FIG. 14 is generally comprised of a section of the transmission line known to have delay. This is because passive circuit components tend to exhibit less process and temperature variations compared to transistors and therefore, their use as a delay reference will improve stability of the active delay line. The signal 1410 which is input to both the reference delay block 1420 and the variable delay cell 1460 does not have to be periodic and it could be arbitrary. This is because in a DLL using a reference delay block only transitions are of interest.

The DA modulators of the present invention can be any of a variety of electroabsorptive modulators, such as phase modulators, forward and reverse biased PN modulators, and MOS capacitor modulators. Any of the DA modulators of the present invention can be fabricated on a variety of substrates or wafers, such as: a layer of monocrystalline silicon, silicon on insulator (SOI) substrate, a layer of sapphire, an air filled cavity and a five layer substrate of three layers of monocrystalline silicon with two layers of dielectric between them. It is also possible to use gallium arsenide or indium phosphide substrates or wafers to construct DA modulators of the present invention. Other substrates and platforms may also be used.

One advantage of fabricating distributed amplifier modulators of the present invention on a silicon or SOI substrate, is the ability to use low cost and well developed CMOS processes for the fabrication of the optical, optoelectronic and electronic devices on the same substrate or wafer. If a distributed amplifier modulator is fabricated on a silicon or SOI substrate, then silicon optoelectronic elements such as the modulating elements can be formed at the same time and of the same silicon used to form the silicon body of a transistor, such as a CMOS transistor.

A wide variety of variations are possible. Components may be added, removed, or reordered. Different components may be substituted out. The arrangement and configuration may be different. Similarly, processing steps may be added or removed, or reordered.

Those skilled in the art will appreciate that the methods and designs described above have additional applications and that the relevant applications are not limited to those specifically recited above. Also, the present invention may be embodied in other specific forms without departing from the essential characteristics as described herein. The embodiments described above are to be considered in all respects as illustrative only and not restrictive in any manner.

What is claimed is:

1. An optoelectronic device comprising:
a waveguide structure including a plurality of optical modulator elements each having an optical property that is adjustable upon application of an electrical signal so as to modulate light guided in said waveguide structure; and
a plurality of amplifiers, each amplifier electrically coupled to one of said optical modulators to apply electrical signals thereto, and each amplifier having an input node and an output node,
wherein at least one of the plurality of amplifiers comprises one or more first type transistors electrically connected between a first reference potential and an output node and one or more second type transistors electrically connected between said output node and a second reference potential, said first and second type transistors being complementary, and each of the plurality of optical modulator elements is optically coupled in series to at least one other of the plurality of optical modulator elements.

2. The optoelectronic device of claim 1, wherein said first type transistors comprise NFET transistors and said second type transistors comprise PFET transistors.

3. The optoelectronic device of claim 1, wherein said first type transistors comprise npn bipolar transistors and said second type transistors comprise pnp bipolar transistors.

4. The optoelectronic device of claim 1, further comprising active breakdown protection circuitry to limit the voltage drop across at least one transistor to prevent breakdown thereof.

5. An optoelectronic device comprising:
a waveguide structure including a plurality of optical modulator elements each having an optical property that is adjustable upon application of an electrical signal so as to modulate light guided in said waveguide structure,
a plurality of amplifiers, each amplifier electrically coupled to one of said optical modulators to apply electrical signals thereto, and each amplifier having an input node and an output node, wherein at least one of the plurality of amplifiers comprises one or more first type transistors electrically connected between a first reference potential and an output node and one or more second type transistors electrically connected between said output node and a second reference potential, said first and second type transistors being complementary, and
active breakdown protection circuitry to limit the voltage drop across at least one transistor to prevent breakdown thereof,
wherein the active breakdown protection circuitry includes at least one capacitor electrically connecting a node between two of said first type transistors to a node between two of said second type transistors.

6. The optoelectronic device of claim 5, wherein said first type transistors comprise a first and a second NFET, and the said second type transistors comprise a first and a second PFET, and the said capacitor electrically connects a source of the first NFET and a drain of the second NFET to a source of the first PFET and a drain of the second PFET.

7. An optoelectronic device comprising:
a waveguide structure including a plurality of optical modulator elements each having an optical property that is adjustable upon application of an electrical signal so as to modulate light guided in said waveguide structure,
a plurality of amplifiers, each amplifier electrically coupled to one of said optical modulators to apply electrical signals thereto, and each amplifier having an input node and an output node, wherein at least one of the plurality of amplifiers comprises one or more first type transistors electrically connected between a first reference potential and an output node and one or more second type transistors electrically connected between said output node and a second reference potential, said first and second type transistors being complementary, and
active breakdown protection circuitry to limit the voltage drop across at least one transistor to prevent breakdown thereof,
wherein said active breakdown protection circuitry electrically connects a gate to a source or to a drain of a field effect transistor or electrically connects a base to an emitter or collector of a bipolar transistor.

8. An optoelectronic device comprising:
a waveguide structure including a plurality of optical modulator elements each having an optical property that is adjustable upon application of an electrical signal so as to modulate light guided in said waveguide structure; and
a plurality of amplifiers, each amplifier electrically coupled to one of said optical modulators to apply electrical signals thereto,
wherein at least one of the plurality of amplifiers comprises a single pair of complementary transistors, and each of the plurality of optical modulator elements is optically coupled in series to at least one other of the plurality of optical modulator elements.

9. The optoelectronic device of claim 8, wherein the complementary transistors comprise npn and pnp bipolar transistors.

10. The optoelectronic device of claim 8, wherein said the complementary transistors comprise NFET transistors and PFET transistors.

* * * * *